United States Patent [19]
Lee et al.

[11] Patent Number: 5,479,328
[45] Date of Patent: Dec. 26, 1995

[54] HIGH-BRIGHTNESS, HIGH-EFFICACY BACKLIGHT

[75] Inventors: James Y. Lee, Irvine; Joseph T. Suste, Orange; Stephen S. Wilson, San Juan Capistrano, all of Calif.

[73] Assignee: Interstate Electronics Corporation, Anaheim, Calif.

[21] Appl. No.: 177,564

[22] Filed: Jan. 5, 1994

[51] Int. Cl.⁶ .................................................. F21V 7/09
[52] U.S. Cl. ........................ 362/216; 362/217; 362/346; 362/347
[58] Field of Search ................ 362/29, 216, 217, 362/346, 347

[56] References Cited

U.S. PATENT DOCUMENTS

| | | |
|---|---|---|
| 3,047,763 | 7/1962 | Inman . |
| 3,258,630 | 6/1966 | Scott . |
| 3,508,103 | 4/1970 | Young . |
| 4,266,167 | 5/1981 | Proud et al. . |
| 4,425,604 | 1/1984 | Imai et al. ............................ 362/347 |
| 4,743,799 | 5/1988 | Loy . |
| 4,767,965 | 8/1988 | Yamano et al. . |
| 4,851,734 | 7/1989 | Hamai et al. . |
| 4,920,298 | 4/1990 | Hinotani et al. . |
| 5,067,053 | 11/1991 | Akizuki ................................ 362/347 |
| 5,143,433 | 9/1992 | Farrell ................................. 362/29 |
| 5,186,537 | 2/1993 | Katoh et al. .......................... 362/346 |
| 5,253,151 | 10/1993 | Mepham et al. ....................... 362/216 |

FOREIGN PATENT DOCUMENTS 89869  1/1959  Netherlands .......................... 362/216

OTHER PUBLICATIONS

Flat Fluorescent Lamp for LCD Back-Light, K. Hinotani et al., 1988 International Display Research Conference, pp. 52–55.

Fluorescent Backlights for LCDs, W. Burt Mercer and James A. Schoke, Information Display Nov. 1989, pp. 8–13.

Multiplicity of Discharge Channels for a Flat Fluorescent Lamp to Backlight a Full Colour LCD, M. Anandan and Doug Ketchum, Thomas Electronics, Inc., 4 pages.

Custom and Standard Flat Fluorescent Lamps, Backlight Assemblies, Invertors, and Associated Products, Brochure, Flat Candle Company, Colorado Springs, Colo., 10 pages.

Electro-Optical Products-Cathode Luminescent Lamp, Imaging & Sensing Technology, Horseheads, NY 14845, 1 page.

5.2: Design of a Multichannel True Flat Fluorescent Lamp for Avionic, TFT-LCD Backlighting, M. Anandan, et al., SID 93 Digest, pp. 25–28.

*Primary Examiner*—Ira S. Lazarus
*Assistant Examiner*—Sara Sachie Raab
*Attorney, Agent, or Firm*—Calfee, Halter & Griswold

[57] ABSTRACT

A backlight comprising a serpentine fluorescent tube nested in a uniquely shaped reflector. Much of the light emitted from the tube is directly emitted to a bounded image plane. The reflector reflects a substantial portion of the rest of the light emitted by the tube to the image plane in such a manner that a very bright and uniform image is formed at the image plane.

14 Claims, 7 Drawing Sheets

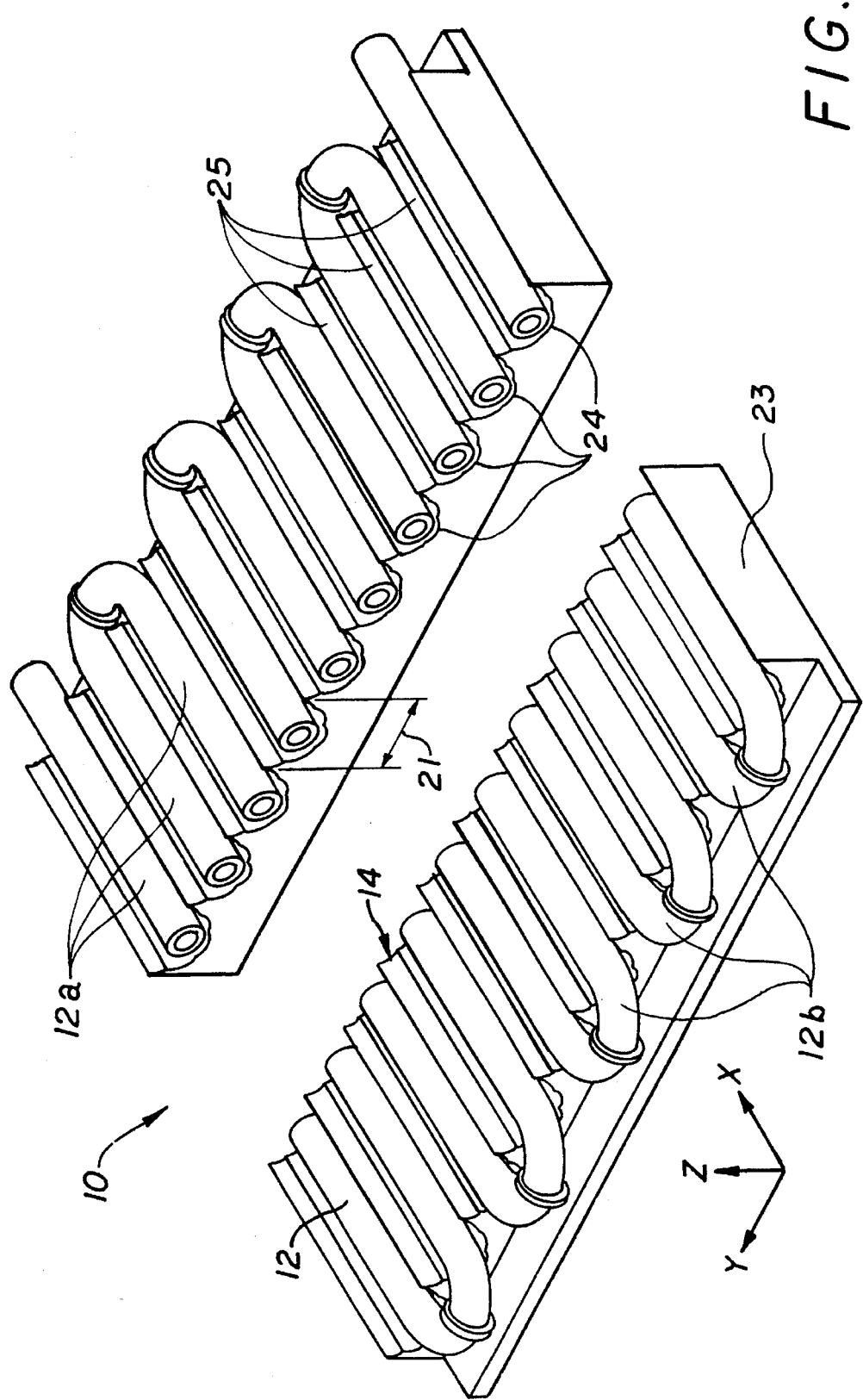

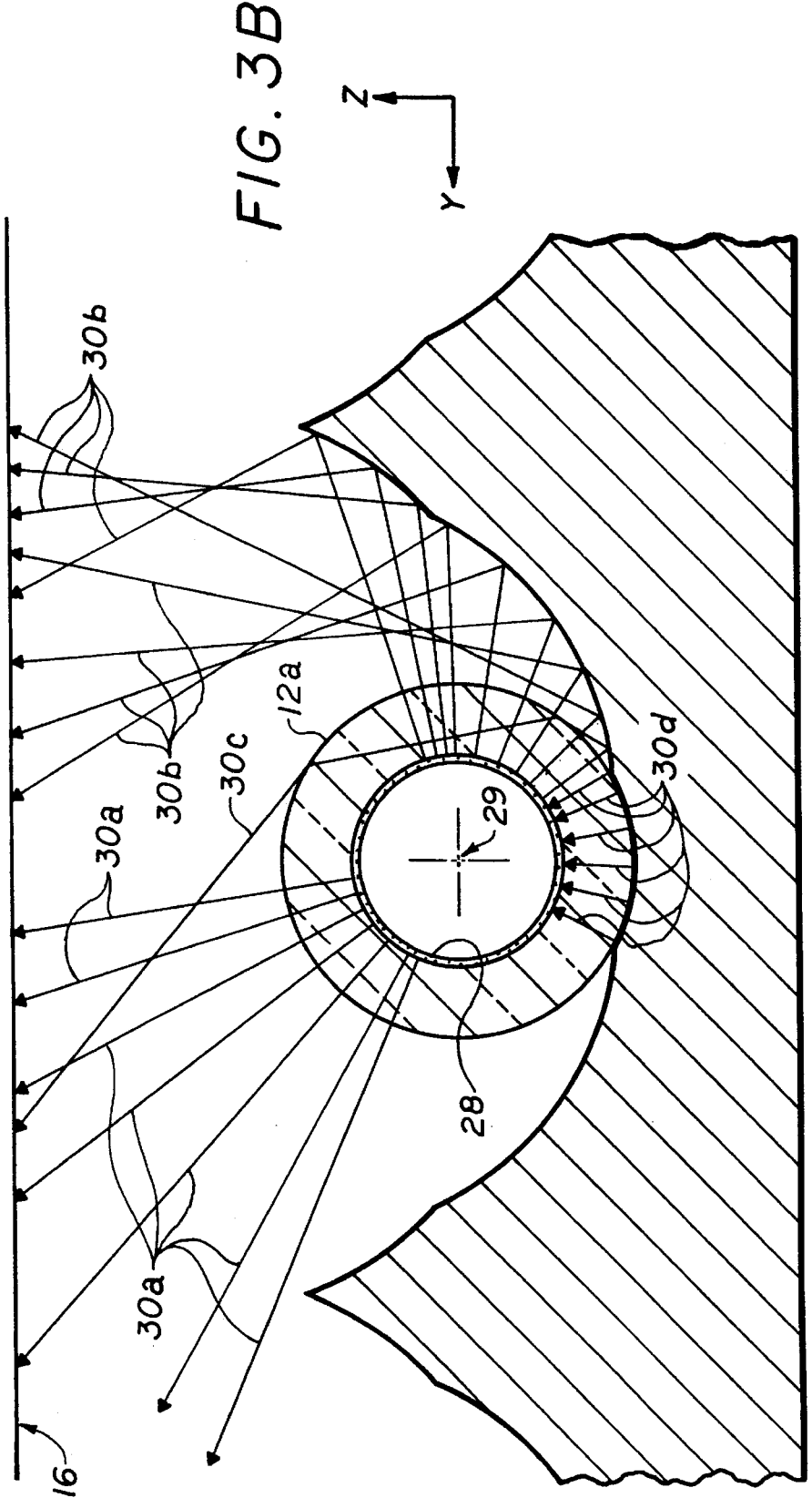

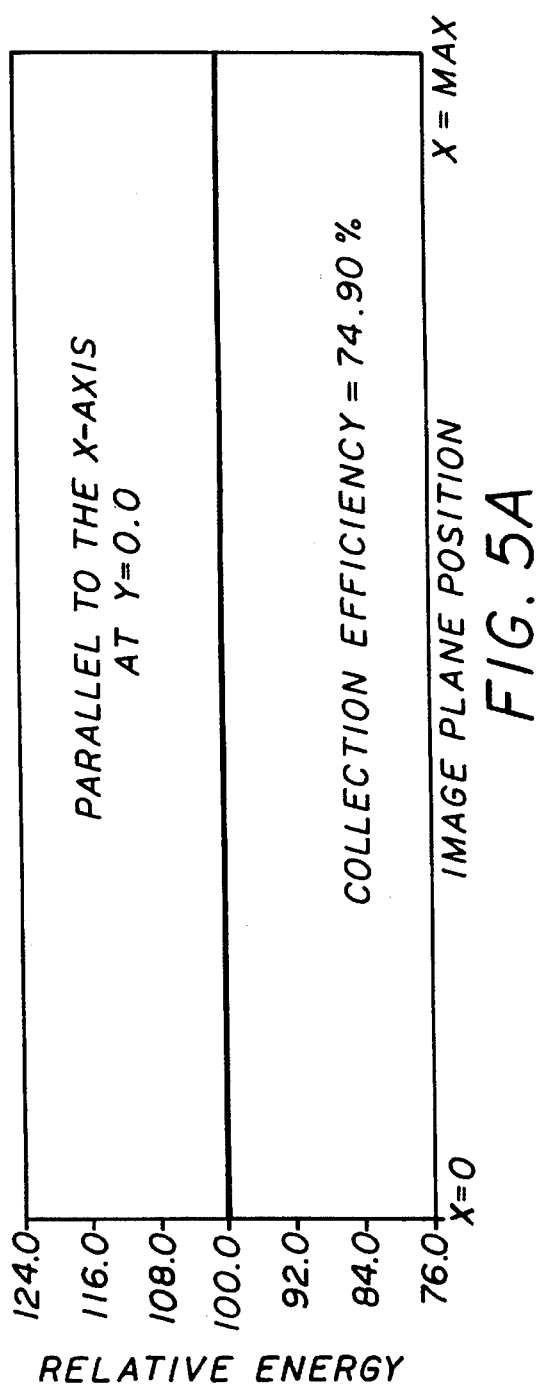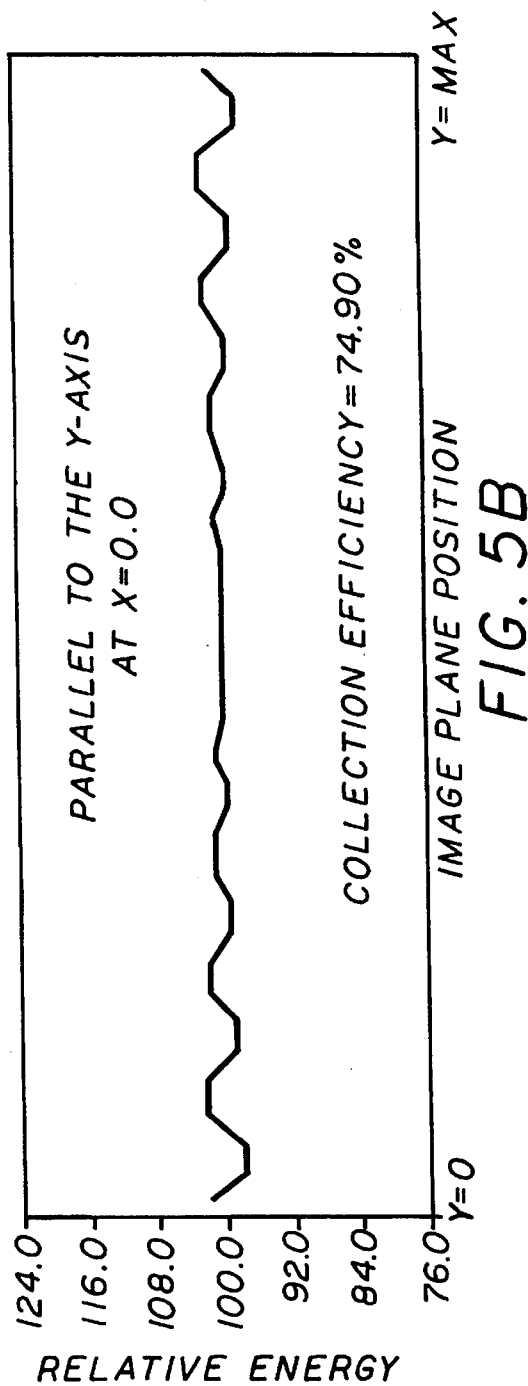

HIGH-BRIGHTNESS, HIGH-EFFICACY BACKLIGHT

FIELD OF THE INVENTION

The present invention relates generally to backlights for liquid crystal displays and, more specifically, to a high-brightness, high-efficacy backlight using a uniquely shaped multichannel reflector to reflect light from a serpentine fluorescent tube to an image plane.

BACKGROUND OF THE INVENTION

Computers and other devices requiring a visual interface often use liquid crystal displays (LCDs) to display data. Recently color LCDs have come into common usage. Two forms of color LCDs exist: active matrix and passive matrix. Both require light rays from a backlight to generate the colors. The backlight generates an image plane of light beneath the LCD, which in turn generates the color display. In both passive matrix and active matrix systems, the color is generated by a tricolor filter. Active matrix LCDs are more popular because of their excellent image quality, high speed, high contrast ratio, and superior color quality.

As is well known in the art, an active matrix color liquid crystal display (AMLCD) transmits only a small percentage of the light generated by the backlight. Typical active matrix LCDs transmit approximately three percent (3%) of the intensity of the backlight. The intensity of the AMLCD is directly related to the intensity of the backlight. Therefore, to have a high intensity transmitted to the user, the backlight must be very bright: roughly thirty (30) to fifty (50) times as bright as the desired viewer intensity.

For indoor use, the 1000 footlamberts (ft-L) generated by most common backlights is sufficient. This results in a 30 ft-L intensity to the user, which is more than sufficient for indoor use. However, to be readable in sunlit environments, such as a passenger automobile, an aircraft cockpit, or an outside environment visited by field technicians, a much brighter backlight is required. The goal intensity for sunlight readability is 200 ft-L as seen by the viewer.

Moreover, for effective sunlight readability, a special front display filter is added to prevent high-intensity sun light reflections from washing out the LCD image. This front display filter reduces the active matrix LCD's light transmission from about 3% to about 2%. This low transmission rate plus the high intensity level needed for sunlight readability requires the use of a very bright backlight.

However, many common high intensity light sources also generate a great deal of heat. This is a problem because LCDs do not tolerate heat well. LCDs have a relatively narrow range of operating temperatures. At temperatures below 0° C. the crystals' movements become sluggish. Above 75° C. the dielectric constant of the crystals within the LCD changes, thereby reducing the performance of the display. At temperatures at and above approximately 85° C., LCDs reach what is called the "clearing point," where the crystals within the liquid crystal display irreversibly break down. At temperatures below the clearing point, any degradation in performance is reversible. That is, if the LCD is cooled, it will perform as it once did. However, once the LCD reaches the clearing point, cooling the LCD will not reverse the damage. The LCD is unusable.

The "coolness" of an LCD's operation is generally expressed as a luminous efficacy, which is defined as the energy in watts needed to produce the luminous intensity reaching the image plane in lumens per watt (lm/w). A high efficacy backlight will have a high lumens per watt value. To be a suitable source of backlighting, any light source must have a high enough luminous efficacy to be cool enough to prevent the LCD from reaching the clearing point. Thus, brute force luminous intensity is not acceptable because typical high-brightness light sources, such as halogen lamps, generate large amounts of heat.

Moreover, a backlight should have a "low profile;" that is, it should be relatively thin. Some light sources that are bright enough and cool enough are not suitable for use as a backlight because of their thickness. An example of such a device is a cathodoluminescent lamp, which generates 10,000 ft-L in a three inch thick package.

In addition, a backlight should have a long lifetime. Also, a backlight should have a high degree of uniformity across the face of the LCD; that is, the image plane created by the backlight must be substantially uniform. These values are calculated as follows. First, the two extremes of the measured intensity values are averaged to yield an average value, which is considered to be 100% relative intensity. Then the measured values are scaled against that average value to yield intensity uniformity values of 100% ±some value. A value within the range of 100% ±5% within a one square inch area and 100% ±15% within the entire display along either or both axes is acceptable. A value outside that range is considered not suitable.

Additionally, a backlight must emit light in the wavelengths required by the tricolor filter of the AMLCD. Active matrix color LCDs require the backlight to provide light at specific frequencies. A backlight without the required frequencies will cause the LCD to display colors of disproportionate intensity and color shift.

In short, a suitable backlight should have a high luminous intensity, have a high luminous efficacy, have a low profile, have a long lifetime, have a high uniformity, and must emit light in the required wavelengths.

The prior art backlights do not offer all of these qualities. Powder electroluminescent (powder EL) backlights have a short lifetime, a low luminous efficacy, and poor color generation. Typical powder EL backlights have a lifetime of only approximately 500 hours. Even newer high-cost powder EL backlights are limited to approximately 1000 hours of use. Moreover, the luminous efficacy of powder EL backlights is totally unacceptable at 0.1 lm/w. In addition, powder EL backlights are limited in color.

Incandescent lamps and light emitting diodes (LEDs) are expensive, very bulky, nonuniform, and limited in color. They also have a high power consumption and generate tremendous amounts of heat.

Fiber optic backlights are very expensive, very bulky, and have a high power consumption. Fiber optic backlights typically comprise a light source coupled to the LCD matrix via a mesh or web of optical fibers. Bends in the web/mesh cause light to leak out at certain predetermined points. Such an arrangement is costly to manufacture and not uniform in intensity.

Thin film electroluminescent (thin film EL) panels are expensive, have a low luminous efficacy of approximately 2 lumens per watt, have a low intensity uniformity, and are limited in color.

Fluorescent tubes are a likely candidate for an improved backlight because standard fluorescent tubes have an intensity of 8000 ft-L and a maximum luminous efficacy of approximately 80 lumens per watt. However, typical fluorescent tube backlights are far from ideal. With a flat reflector beneath the tube, even a serpentine tube, the uniformity at the image plane is well outside the acceptable values listed above (at useful thicknesses). To achieve a suitable uniformity, either the thickness must be increased beyond the useful range, or a very thick diffuser material must be added between the tube and the image plane. The diffuser absorbs a significant amount of the light energy, thereby reducing the backlight intensity and the luminous efficacy.

Some commercially available laptop computers use fluorescent tubes in an edge-light configuration. Light from two fluorescent tubes located at the edge of the LCD panel is reflected toward the LCD image plane by two ramped reflectors with a very low slope. Such a configuration provides sufficient luminous intensity for some indoor, non-sunlight uses, but does not produce nearly enough luminous intensity for sunlight uses.

Serpentine fluorescent lamps are also known in the art. Serpentine fluorescent lamps are very efficient. Fluorescent tubes have three areas while energized and generating light: the negative glow, the Faraday dark space, and the positive column. The negative glow is seen in common fluorescent lamps as a short red area. The positive column is the longer area that runs substantially the length of the tube and is much more efficient at generating ultraviolet light, which the phosphor in the tube uses to generate white light. Serpentine fluorescent lamps have a high luminous efficacy because they maximize the length of the positive column and minimize the length of the negative glow region. Thus, serpentine fluorescent lamps are an excellent starting point.

However, much of the light emitted by a serpentine fluorescent lamp does not reach the image plane of the LCD. Without a reflector, the tube causes a very nonuniform light distribution at the image plane. Adding a flat reflector beneath the tube improves the light distribution, but the uniformity is still outside the acceptable limits, stated above. The major light absorber is the phosphor on the inside surface of the tube.

There have been many attempts to develop a backlight with all of the above desirable properties. For example, one approach is to provide a backlight that uses multiple gas channels to form a plasma sheet to excite the phosphor within the sheet. Such a device generates about 3000 ft-L, but has a very low luminous efficacy (only approximately 15.6 lm/w).

Another approach is to provide a tube comprising a molded glass sheet in a serpentine shape. Such tubes have a brightness of 2500 ft-L, but are so hot that they require a fan to constantly cool them.

Yet another device is a "cathodoluminescent lamp." The light source is a modified cathode ray tube and obtains a brightness of 10,000 ft-L. However, the unit is three (3) inches thick, which is much too thick to be practical, and the luminous efficacy is so low that it requires constant cooling with a fan.

Thus, as can be seen, none of the available backlight technologies provide a high brightness, high efficacy, high uniformity, and low cost solution to backlighting sunlight viewable active matrix LCDs.

SUMMARY OF THE INVENTION

According to the present invention, a backlight is provided having a fluorescent tube nested within a uniquely shaped reflector. Much of the light emitted from the tube is emitted directly to a bounded image plane. The reflector reflects a substantial portion of the rest of the light emitted by the tube to the image plane in such a manner that a very bright and uniform image is formed at the image plane.

The surface of the reflector was designed using ray tracing methods to achieve a backlight having high brightness, high luminous efficacy, high uniformity, a low profile, and low cost. The fluorescent tube generates light 360 degrees around its cross section. The reflector is configured such that light from all but a minor portion of the light is either directly transmitted to the image plane by the tube or reflected to the image plane by the reflector. The multichannel reflector reflects enough of the light not directly radiated by the tube to the image plane that 74.9% of the energy radiated by the tube reaches the image plane under ideal conditions.

The geometry of the reflector was determined by applying ray tracing methods, which are well known in the art of optical design, to the problems of reflecting most of the light from the tube to the image plane and achieving a very uniform intensity distribution at the image plane. During the ray tracing process, the index of refraction of the glass tube was taken into consideration and used to bend the light away from the light absorbing phosphor and toward the image plane.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

FIG. 1A is a cut away perspective view of a portion of the backlight of the present invention;

FIG. 3B shows the same structures as FIG. 3A with the addition of approximate paths of light rays leaving the tube and being focused onto the image plane;

FIGS. 5A and 5B show the nominal relative energy distributions for the reflector of the present invention under ideal conditions.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description that follows that persons of skill in the appropriate arts can modify the invention here described while still achieving the favorable results of this invention. Accordingly, the description that follows is to be understood as being a broad, teaching disclosure directed to persons of skill in the appropriate arts, and not as limiting upon the present invention.

Figure 1B:
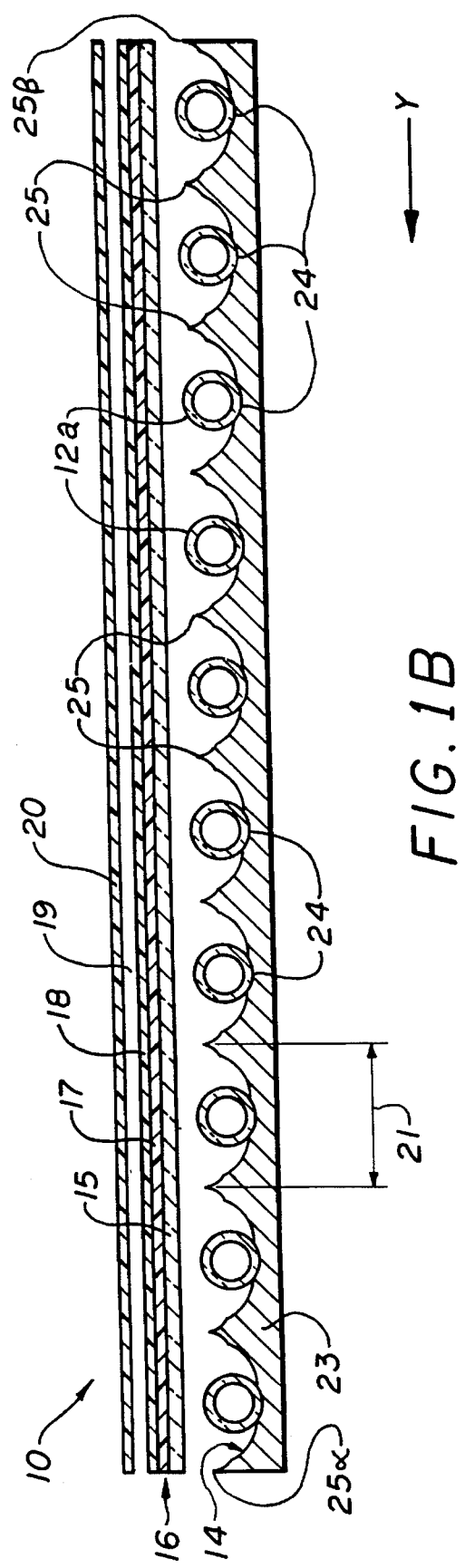
FIG. 1B is a sectional view taken substantially along the plane designated by line 1B—1B in FIG. 2 and showing additional components.
Figure 2:
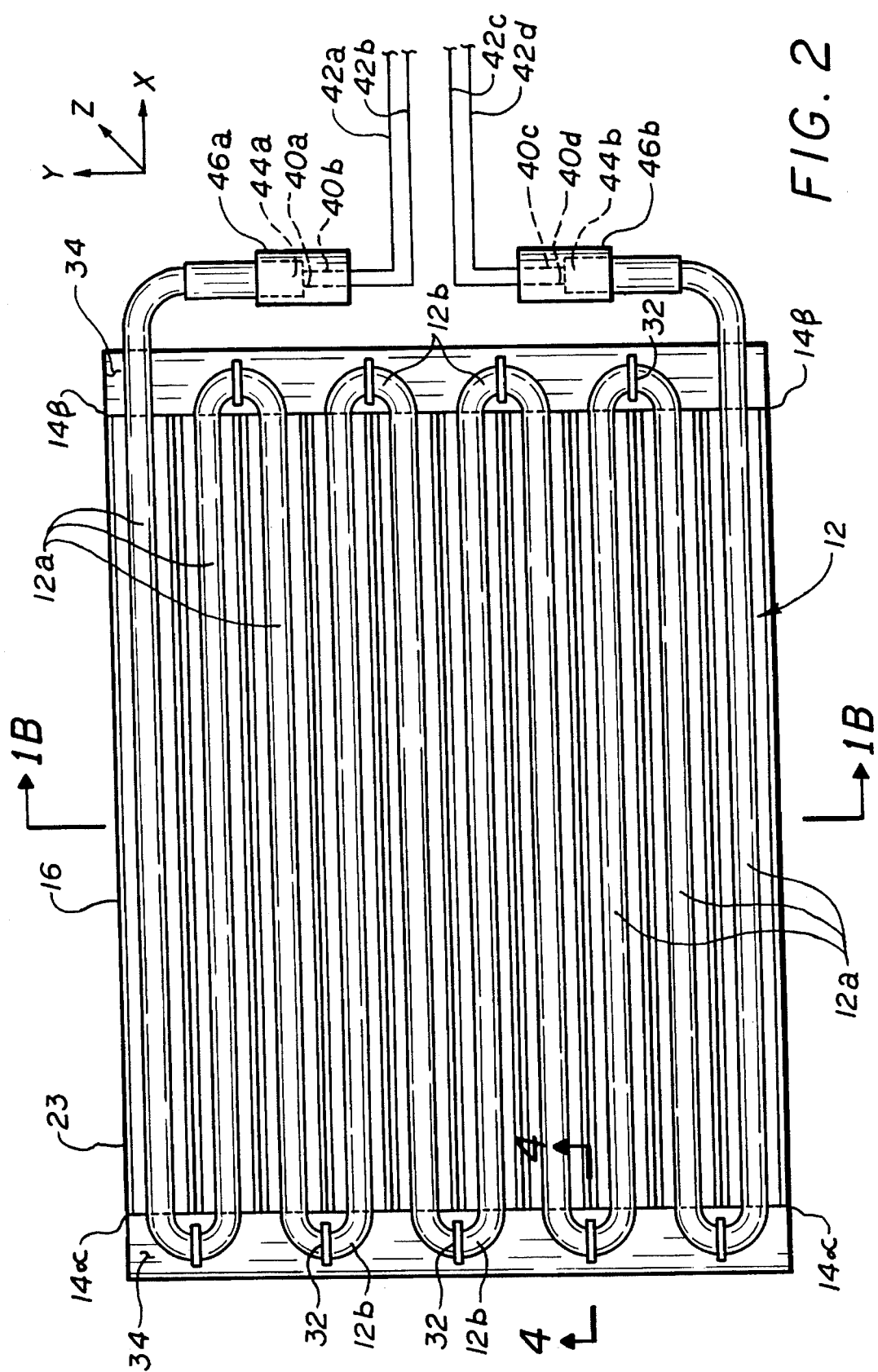
FIG. 2 is a top view of the fluorescent tube of the present invention.
Figure 4:
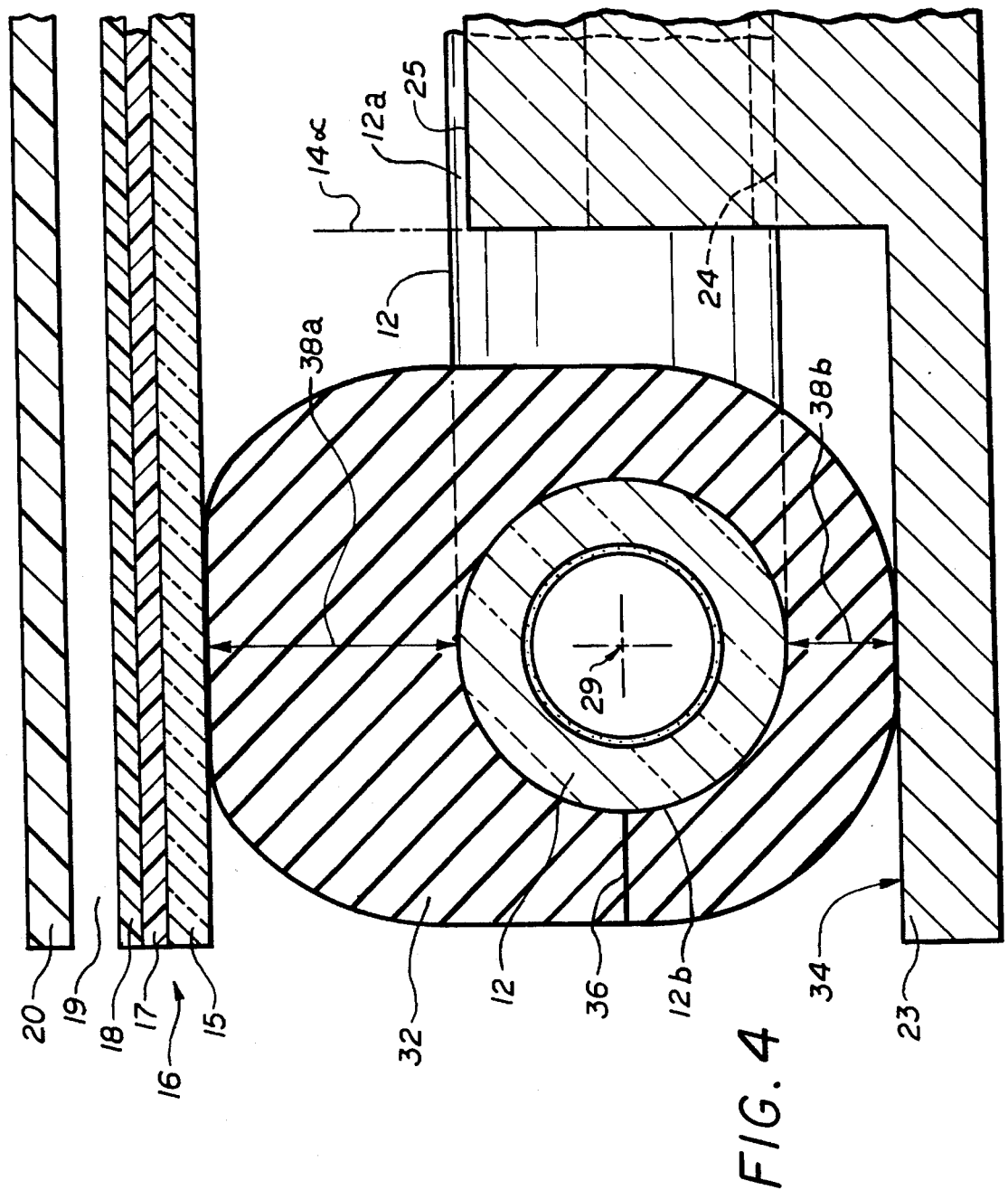
FIG. 4 is a transverse sectional view showing the rubber rings used to secure the tube in the reflector.

Referring now to the drawings and more particularly to FIGS. 1A and 1B, a backlight embodying the present invention is there shown and generally indicated at 10. The backlight 10 comprises a serpentine fluorescent tube 12 nested within a multichannel reflector 14 with a unique geometry. Proximate the tube 12 is a glass plate 15, the top surface of which forms a bounded virtual image plane 16. The reflector 14 focuses the light from the tube 12 into a bright, uniform plane of definite boundaries at the image plane 16. As shown in FIG. 2, the image plane 16 is bounded by reflector ends 14α and 14β (FIGS. 2 and 4) in the x-axis. The image plane 16 is bounded by outer peaks 25α and 25β (FIG. 1B) in the y-axis. On the image plane 16 is placed a diffuser 17 which scatters the light beams, thereby making the image plane 16 appear more uniform in intensity. Resting upon the diffuser 17 is a layer of brightness enhancement film (BEF) 18. An air gap 19 separates the BEF 18 from an active matrix color liquid crystal display (AMLCD) 20.

FIG. 1B shows the straight portions 12a of the tube 12 nested in ten reflector channels 21. The glass plate 15, image plane 16, diffuser 17, BEF 18, air gap 19, and AMLCD 20 are shown proximate the tube 12 and reflector 14.

The glass plate 15 is 0.060 inches thick and is made of borosilicate. The diffuser 17 is a 95% efficient diffuser manufactured by 3M and available as part number LP-20. The BEF 18 is manufactured by 3M Optical Systems, 3M Safety and Security Systems Division, 3M Center, Building 225-4N-14, St. Paul, Minn. 55144-1000, and available as part number BEF 90/50. The air gap 19 is approximately 0.1 inches thick. The active matrix liquid crystal display 20 is manufactured by Sharp and available as part number LQ-10DH11.

FIG. 2 shows the tube 12 in more detail. The tube 12 is a hot filament fluorescent tube having a circular cross section, a 7 millimeter (0.276 inch) overall thickness (outer diameter), and a 4 millimeter inner diameter and generating 8000 ft-L. The tube 12 is 100 inches long and has ten straight, parallel segments 12a with nine 180-degree circular bends 12b. The tube 12 is filled with a mixture of neon and argon gases and mercury, as is well known in the art. As shown in FIG. 2, bends 12b in the tube 12 extend beyond the edges of the image plane 16. The tube 12 has the following electrical drive conditions: a typical lamp drive voltage of 1000 V rms at 60 KHz and a typical lamp drive current of 50 mA rms at 60 KHz, with a typical lamp turn-on attack voltage of 3000 V rms at 60 KHz. The tube 12 has the following hot filament drive conditions (values apply to each of the two electrodes): a typical filament voltage of 2 V rms at 60 KHz and a typical filament current of 300 mA rms at 60 KHz. The tube 12 has a typical surface brightness of 8000 ft-L, a lamp brightness uniformity of ±7.5% and lamp color coordinates of X=0.313±0.020 and Y=0.313±0.020. The tube 12 has a lamp life of 7500 hours, defined as the time when the lamp brightness becomes 50% of the original lamp brightness when the tube 12, during its life, has been maintained within the operating specifications defined above.

Referring again to FIG. 2, the tube 12 has two pairs of electrodes 40a–40d, which are in electrical circuit communication with four wire leads 42a–42d. The two ends 44a and 44b of the tube 12 are covered with shrink wrap 46a and 46b, as is well known in the art. The wire leads 42a–42d are #22 gauge wire.

Figure 3A:
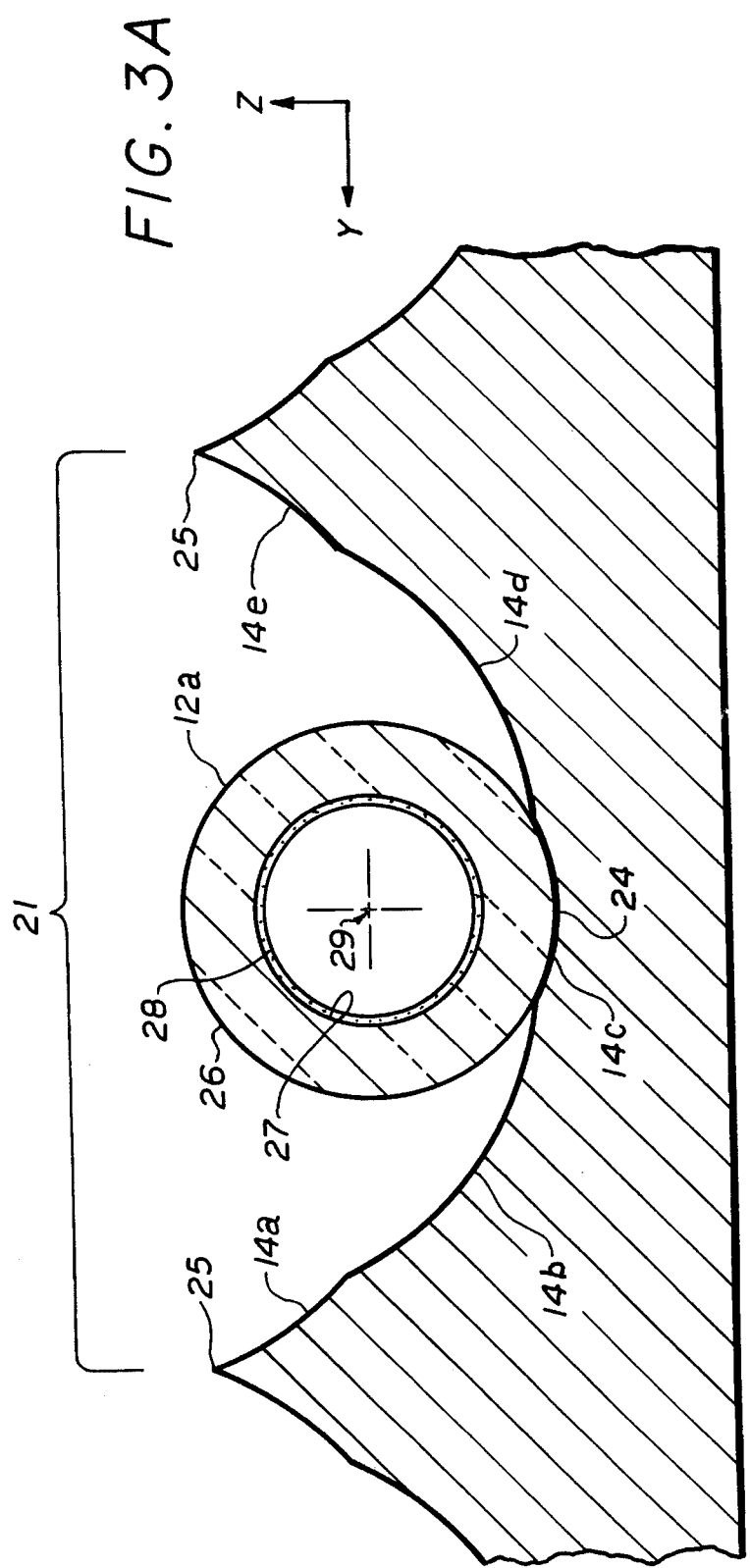
FIG. 3A is a transverse sectional view of one portion of the fluorescent tube nested within the reflector of the present invention taken substantially normal to the tube.

The reflector 14 has ten channels 21. FIGS. 3A and 3B show a single one of the reflector channels 21 in more detail. The reflector 14 was ground into a thin, rectangular aluminum plate 23 with a numerically controlled grinding machine, model MFP125, manufactured by Maegerle and controlled by a Siemens controller. Form Grind, at 30062 Aventura, Rancho San Margarita, Calif. 92688, performs such grinding. The channels 21 are identical in shape. In the backlight 10, the bends 12b of the tube 12 extend beyond the end of each channel 21. In the alternative, the reflector 14 can be made as a serpentine reflector, in which the entire tube 12 is nested inside a single serpentine channel.

As shown in the figures, each channel 21 of the multichannel reflector 14 has a channel nadir 24 and a pair of channel peaks 25. The inner nine peaks 25 are each shared by two tube sections 12a, as is shown in FIGS. 1B, 3A, 3B, and 4. The image plane 16 is bounded by outer peaks 25α and 25β (FIG. 1B) in the y-axis. Table I shows the geometric shape of one channel 21 between one of the peaks 25 and the nadir 24 and, thus, shows the values necessary to make the reflector 14. The Z axis and Y axis of Table I are marked in FIG. 1A as such. The values in Table I represent a single side of a single channel 21; that is, the data in Table I extend from one channel peak 25 to the channel nadir 24. The reflector 14 is symmetrical; therefore, to cut a single channel 21, the values in Table I must be mirrored to generate the other side of the channel from the nadir 24 back to the other peak 25. Likewise, the reflector has ten channels 21; therefore, the one reflector channel must be replicated nine more times. As will be described in the text accompanying FIG. 4, a flat surface is cut into the aluminum plate 23 beneath the tube bends 12b. In the alternative, the surface defined by Table I can be cut into the area under the tube bends.

The channel peaks 25 are spaced 0.7000 of an inch apart. The aluminum plate 23 retains a 0.1 inch thickness at the channel nadir 24 and the aluminum plate 23 is 0.361 inches thick at the channel peaks 25. The glass plate 15 is situated such that the image plane 16 lies 0.550 inches above the channel nadir 24. The channel 21 is 0.265 inches deep from peak 25 to nadir 24, measured vertically with the backlight 10 positioned as in FIGS. 1B, 3A, and 3B. The critical values are the 0.550 inches from image plane 16 to nadir 24 and the 0.265 inch deep channel 21. With the tube 12 being only 7 millimeters (0.276 inches) in overall thickness, only 0.011 inches of the 0.276 inch tube cross section is exposed to adjacent tube sections 12a. This exposure of 4 percent of overall thickness is insubstantial and may be removed by remodeling the reflector surface such that the vertical distance from peak to nadir is greater than the overall thickness of the tube 12.

The thickness of the plate 23 beneath the nadir 24 is arbitrary and can be altered to provide differing rigidities and weights for the backlight. A suitable thickness for the plate 23 beneath the nadir 24 is 0.1 inches.

The shape of the reflector 14 was designed using well known ray tracing methods. The fluorescent tube 12 generates light 360 degrees around its cross section (light rays 30 are shown in FIG. 3B). Much of this light is radiated directly by the tube 12 to the image plane 16 in a very nonuniform intensity distribution. The reflector 14 is configured such that much of the light not directly radiated by the tube to the image plane is reflected to the image plane 16 by the reflector 14. As will be more fully explained in the text accompanying FIG. 3B, only about 60° of the 360° pattern is reflected by the reflector 14 back into the tube 12. Although the reflector 14 was not designed to follow any particular equation, the cross section of the reflector 14, shown in FIGS. 3A and 3B, appears to have five sections 14a–14e, each shaped substantially like a segment of a plurality of hypothetical circles. The centers of the hypothetical circles, the segments of which form the reflector cross section in FIGS. 3A and 3B, do not appear to share a common point.

Ideally (i.e., assuming a tube 12 with perfect brightness uniformity and perfectly circular cross sections, perfectly straight and parallel linear portions 12a, a tube 12 with an index of refraction of exactly 1.49, perfect positioning of the tube 12 within the reflector 14, a reflector 14 with a perfectly smooth and perfectly reflective surface, and a reflector curve ground exactly to that specified in Table I), the reflector 14 reflects enough of the light not directly radiated by the tube 12 to the image plane 16 that 74.9% of the energy radiated from the tube 12 reaches the image plane 16. Using the reflector 14 of the present invention, a backlight 10 can be constructed having a brightness of 4216 ft-L, a luminous efficacy of 46.4 lm/w, a y-axis uniformity of 98%, and an x-axis uniformity of 100% is achieved in a package only 0.65 inches thick. Adding the layer of brightness enhancement film 18, manufactured by 3M, increases the luminous intensity to 6232 ft-L with the same parameters. Of course, imperfections in the tube 12, backscatter from the diffuser 17, and reflections from the glass plate 15 might affect these values when put into actual use.

The geometry of the reflector was determined by applying ray tracing methods, which are well known in the art of optical design, to the problem of reflecting most of the light from the tube 12 to the image plane 16. During the ray tracing process, the index of refraction (in this embodiment 1.49) of the glass tube 12 was taken into consideration and used to bend the light away from the light absorbing phosphor and toward the image plane 16. The reflector 14 need not have the exact shape defined in Table I to achieve excellent results. Other satisfactory reflector geometries can be developed using ray tracing. Thus, the invention is not limited to merely the reflector defined in Table I; rather it is intended to also encompass other reflectors designed using ray tracing methods.

After cutting or otherwise forming the ten channels 21 of the desired shape into the aluminum plate 23, the reflector 14 is optically polished and coated with silver. First, the surface of the reflector 14 is polished to have a reflectance of greater than 90% for light having wavelengths of from 400 nm to 700 nm. Scratches (long and narrow imperfections) should not be wider than about 0.005 inches for any one defect. The integrated total area occupied by all scratches of lesser width, after discounting those smaller than 0.001 inches wide, should not exceed a total area of 0.005 inches wide and 3.67 inches long. Digs and voids (and all other imperfections which are generally round in nature) should not be wider than 0.03 inches in any dimension, and within any given area bounded by a circle that has a diameter of 0.787 inches in size, after discounting all defects less than 0.005 inches in size, in its largest dimension, the integrated total of such imperfections should not exceed an area formed by a circle of about 0.06 inches in diameter.

After polishing, the reflector 14 is then coated with the silver. The silver coating must be done in a way so as to give the reflector 14 a reflectance of greater than about 95% for light of between about 400 to about 450 nm, a reflectance of greater than about 97% for light of between about 450 to about 500 nm, and a reflectance of greater than about 98% for light of between about 500 and about 700 nm. A coating of silver approximately 1000Å is sufficient. Another 1000Å thick coating of transparent dielectric material is optionally deposited over the silver to help prevent the reflector from being scratched. Such a coating can be deposited by Cascade Optic, 1225 E. Hunter Avenue, Santa Ana, Calif.

The silver coating should be free of peeling using the standard tape test and free of scratches when the coating is wiped with an alcohol-soaked tissue. Discolorations and stains in the coating should not be visible to the naked eye of one with normal vision at arm's length under normal overhead lighting conditions.

Referring again to FIGS. 3A and 3B, a cross section of a single channel 21 is shown with the tube section 12a nested therein. The fluorescent tube 12 has an outer surface 26 and an inner surface 27. A layer of phosphor 28 coats the inner surface 27, as is well known in the art. The phosphor 28 must be selected to match the wavelength requirements of the AMLCD 20. The triband fluorescent phosphor should have spectra peaks at 435 nm, 545 nm, and 615 nm. The tube 12 also has a longitudinal axis 29, which is the center of the circular cross section of the tube 12, in the preferred embodiment.

Referring more particularly to FIG. 3B, light rays 30 are shown being emitted radially by the tube 12 in a uniform 360-degree pattern around the axis 29. The light rays 30 are shown leaving the phosphor layer 28, reflecting off the channel 21, and meeting at the image plane 16. For clarity, only a few rays are shown; the ray pattern is actually continuous and symmetrical. The light rays 30 take different paths. When the rays are referred to collectively, they are referred to with the reference "30" without a suffix. When the different ray paths are discussed, they are referred to with the reference "30" with a letter suffix a, b, c, or d.

Many of the light rays 30 either are emitted directly from the tube 12 to the image plane 16 (indicated at 30a) or are reflected directly by the reflector 14 to the image plane 16 (indicated at 30b). However, some rays, one of which is indicated at 30c, are reflected by the reflector 14 and then refracted by the glass tube 12 to the image plane 16. The reflector 14 structure is configured such that rays 30a, 30b, and 30c form a very uniform intensity plane at the image plane 16. This substantially uniform plane 16 should have a nominal energy distribution uniformity of from between 98% to 102% relative energy. Finally, some rays 30d do not end up at the image plane 16. These rays 30d are reflected by portion 14c of the reflector 14 back into and are absorbed by the phosphor coating 28. The rays 30d comprise approximately 60 degrees of the 360-degree illumination pattern. The fewer the rays 30d reflected back into the phosphor 28, the brighter the image plane 16 will be. Expressed another way, the fewer the rays 30 that are reflected back into the volume formed by the inner surface 27 of the tube 12, the brighter in intensity the backlight 10 will be. Moreover, the higher the intensity for a given input wattage, the higher the luminous efficacy will be.

The light ray model shown in FIG. 3B is also used to calculate the nominal collection efficiency of the reflector 14 and the nominal energy distributions shown in FIGS. 5A and 5B. The nominal collection efficiency of the reflector 14 is calculated as follows. The tube 12 is modeled in a computer system as a multiple point light source having a "lambertian" output, meaning that each point of phosphorous 28 on the inner surface 27 of the tube 12 radiates a certain number of light rays in all directions. The rays radiated into the volume defined by the inner surface 27 of the tube 12 are absorbed by the phosphorous 28. Thus, a selectable number of rays are radiated by each point on the phosphorous surface. Values of 20, 40, and 60 are typical numbers of rays radiated per point. These rays are put into a very fine matrix in the computer.

Then the reflector 14 is modeled in the computer model. Next, a ray trace analysis of the tube 12 and reflector 14 is made with respect to the image plane 16 resulting in values for the nominal collection efficiency and nominal energy distribution. The collection efficiency is a measure of the percentage of the energy emitted by the tube 12 that reaches the image plane 16. It is calculated by merely counting the rays that reach the image plane and adding each energy contribution from those rays. For example, typically one million rays are used in the analysis. Thus, each ray starts out with one one-millionth of the energy radiated by the tube 12. The analysis involves determining which rays reach the image plane 16 and which do not. Some rays are directly radiated from the tube 12 to the image plane 16, as are rays 30a in FIG. 3B. Some rays are directly reflected by the reflector 14 to the image plane 16, as are rays 30b in FIG. 3B. Some rays are reflected by the reflector 14 then refracted by the tube 12 to the image plane 16, as is ray 30c in FIG. 3B. Some rays are reflected back into the phosphorous 28, as are rays 30d in FIG. 3B. The energy from all the rays reaching the image plane 16 are added up and the sum is divided by the total tube energy used in the model. The fraction of energy reaching the image plane 16 over total energy (×100) is the resulting nominal collection efficiency. The nominal collection efficiency of the reflector in this embodiment is 74.9 percent.

The nominal energy distribution, shown in FIGS. 5A and 5B, is also calculated using the same energy rays, with the exception that for the energy distribution, the values are not summed. Rather, each point on the image plane 16 receives a particular amount of energy.

The minimum number of rays needed to effectively determine the nominal collection efficiency and nominal energy distribution is determined by calculating these values for the same model using different numbers of rays radiated per point on the phosphorous 28 and comparing the resulting values for the different numbers of rays per point. For example, if the collection efficiency calculated using 40 rays of light per phosphorous point is substantially the same as the collection efficiency calculated using 60 rays of light per phosphorous point, then the value is deemed to be independent of the number of rays per point. However, if the two collection efficiencies are not substantially the same, then more rays per point are needed to remove the dependency of the value on the number of rays per point.

Referring now to FIG. 4 and again to FIG. 1A, the technique used to secure the tube 12 unto the reflector 14 is shown. As shown in FIGS. 1B, 3A, 3B, and 4, the tube 12 is nested into and touching the reflector 14. The tube 12 is secured with a series of rubber rings 32 held in place by compression at the tube bends 12b between the glass plate 15 and a step 34 milled out of the aluminum plate 23. In effect, the tube 12 is sandwiched between the reflector 14 and the glass plate 15 with the rings 32 as a cushioning spacer.

The rings 32 have a slit 36 which is cut through the ring approximately radially. Individual rings 32 are placed over the tube bends 12b by opening the ring 32 at the slit 36 and enclosing a portion of the tube bend 12b with the ring 32. The rubber rings 32 serve two purposes: (1) ensure proper spacing between the glass plate 15 and the reflector 14 and (2) to hold the tube 12 in place in the reflector 14 by exerting force on the tube 12 relative to the glass plate 15 and the reflector 14.

The rings 32 are made of silicone rubber and are approximately 0.1 inches in overall thickness (when laid flat). A first portion 38a of the ring 32 between the tube 12 and the glass plate 15 is thicker than a second portion 38b of the ring 32 between the tube 12 and the step 34. The thicknesses of the first and second portions 38a and 38b should be designed such that when under standard compression levels (approximately 25% compression), the straight portions 12a of the tube 12 are just touching the channel nadirs 24. Suitable thicknesses are 0.400 inches for the first portion 38a and 0.062 inches for the second portion 38b.

FIGS. 5A and 5B show the nominal energy distributions for the backplane of the present invention under ideal conditions (assuming a tube 12 with perfect brightness uniformity and perfectly circular cross sections, perfectly straight and parallel linear portions 12a, a tube 12 with an index of refraction of exactly 1.49, perfect positioning of the tube 12 within the reflector 14, a reflector 14 with a perfectly smooth and perfectly reflective surface, and a reflector curve ground exactly to that specified in Table I). The method used to calculate the nominal energy distributions is discussed above. FIG. 5A shows the nominal energy distribution of the backplane 10 along the x-axis, as shown in FIG. 1A. As can be seen from FIG. 5A, the energy distribution is essentially 100% uniform.

FIG. 5B shows the nominal energy distribution of the backplane 10 along the y-axis, as shown in FIGS. 1, 3A, and 3B. As can be seen from FIG. 5B, the energy distribution uniformity ranges from +98% to 102%, with values near 100% in the center of the backplane 10. The fluctuations in uniformity along the y-axis are attributable to the lack of overlap of patterns near the two edges of the backplane 10. Virtually 100% uniformity is possible in the y-axis if such lack of overlap at the edges is taken into consideration in the ray tracing model.

The measured relative intensity of the backlight is from approximately 94% to 106% relative intensity for a test system comprising the tube 12, the reflector 14, the glass plate 15, and the diffuser 17. The BEF 18 and AMLCD 20 are not used. The measured intensity of the test system ranges from a high of 450 ft-L to a low of 395 ft-L, normal to the diffuser 17, using the 3M LP-20 diffuser 17 and measured with a handheld Minolta Luminance meter with a spot size of approximately 0.2 inches in diameter. The two extremes are averaged to yield a value of 422.5 ft-L, which is considered 100% relative intensity. The measured values of 450 ft-L and 395 ft-L then become 106% and 94% relative intensity, respectively, of that average value.

Using the backlight 10 of the present invention is very simple. The backlight components are assembled as shown in the accompanying Figures. Once assembled, the wire leads 42a–42d are attached to a fluorescent lamp power supply (not shown), as is commonly known in the art. Suitable power supplies are available from numerous commercial suppliers such as Endicott Research Group, Inc., 2601 Wayne Street, P.O. Box 269, Endicott, N.Y. 13760.

The tube 12 generates 8000 ft-L and consumes 42 watts of power; therefore, it has an luminous efficacy of 68.56 lm/w. Of this intensity, 74.9% is reflected to the image plane 16 under ideal conditions. Because of various losses in the reflector 14, losses in the diffuser 17 (the diffuser 17 is only 95% efficient), etc. the efficacy while in use is 46.4 lm/w. Using the reflector 14 of the present invention, a backlight can be constructed having a brightness of 4216 ft-L, a luminous efficacy of 46.4 lm/w, an average y-axis uniformity of approximately 98%, and an x-axis uniformity of virtually 100% is achieved in a package only 0.65 inches thick. Adding the layer of brightness enhancement film 18, manufactured by 3M, increases the luminous intensity to 6232 ft-L with the same parameters. Thus, the brightness to the viewer is 2% of 6232 ft-L or 125 ft-L, which is short of the goal of 200 ft-L, but nonetheless very readable in sunlight.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the portions 14a–14e forming the cross section of the reflector 14 can differ in number and/or shape, with some being segments of circles and some being segments of ellipses. Moreover, a thinner tube glass might yield a higher light collection efficiency in certain circumstances. Therefore, the invention in its broader aspects is not limited to the specific details, representative apparatus and method, and illustrative examples shown and described. Accordingly, departures can be made from such details without departing from the spirit or scope of the applicant's general inventive concept.

TABLE I

| Z | Y | Z | Y |
|---|---|---|---|
| −0.15000000 | 0.00000000 | −0.14945210 | 0.01281256 |
| −0.14999988 | 0.00026180 | −0.14942911 | 0.01307335 |
| −0.14999962 | 0.00052360 | −0.14940566 | 0.01333410 |
| −0.14999886 | 0.00078540 | −0.14938174 | 0.01359480 |
| −0.14999763 | 0.00104720 | −0.14935735 | 0.01385546 |
| −0.14999592 | 0.00130899 | −0.14933248 | 0.01411608 |
| −0.14999373 | 0.00157079 | −0.14930715 | 0.01437664 |
| −0.14999107 | 0.00183258 | −0.14928135 | 0.01463716 |
| −0.14998794 | 0.00209436 | −0.14925508 | 0.01489764 |
| −0.14998433 | 0.00235614 | −0.14922834 | 0.01515806 |
| −0.14998025 | 0.00261792 | −0.14920113 | 0.01541844 |
| −0.14997570 | 0.00287968 | −0.14917345 | 0.01567876 |
| −0.14997067 | 0.00314144 | −0.14914530 | 0.01593903 |
| −0.14996517 | 0.00340319 | −0.14911669 | 0.01619926 |
| −0.14995919 | 0.00366492 | −0.14908760 | 0.01645942 |
| −0.14995274 | 0.00392665 | −0.14905805 | 0.01671954 |
| −0.14994582 | 0.00418837 | −0.14902803 | 0.01697960 |
| −0.14993842 | 0.00445007 | −0.14899754 | 0.01723960 |
| −0.14993055 | 0.00471176 | −0.14896658 | 0.01749955 |
| −0.14992221 | 0.00497343 | −0.14893516 | 0.01775944 |
| −0.14991339 | 0.00523509 | −0.14890326 | 0.01801927 |
| −0.14990410 | 0.00549673 | −0.14887091 | 0.01827905 |
| −0.14989434 | 0.00575836 | −0.14883808 | 0.01853876 |
| −0.14988410 | 0.00601997 | −0.14880479 | 0.01879842 |
| −0.14987339 | 0.00628156 | −0.14877103 | 0.01905801 |
| −0.14986221 | 0.00654313 | −0.14873680 | 0.01931754 |
| −0.14985055 | 0.00680467 | −0.14870211 | 0.01957700 |
| −0.14983842 | 0.00706620 | −0.14866695 | 0.01983641 |
| −0.14982582 | 0.00732771 | −0.14863133 | 0.02009574 |
| −0.14981275 | 0.00758919 | −0.14859524 | 0.02035502 |
| −0.14979920 | 0.00785064 | −0.14855869 | 0.02061422 |
| −0.14978518 | 0.00811208 | −0.14852167 | 0.02087336 |
| −0.14977069 | 0.00837348 | −0.14848418 | 0.02113243 |
| −0.14975572 | 0.00863486 | −0.14844623 | 0.02139143 |
| −0.14974028 | 0.00889621 | −0.14840782 | 0.02165036 |
| −0.14972437 | 0.00915753 | −0.14836894 | 0.02190922 |
| −0.14970799 | 0.00941883 | −0.14832960 | 0.02216801 |
| −0.14969113 | 0.00968009 | −0.14828980 | 0.02242672 |
| −0.14967381 | 0.00994132 | −0.14824953 | 0.02268537 |
| −0.14965601 | 0.01020252 | −0.14820880 | 0.02294393 |
| −0.14963774 | 0.01046369 | −0.14816760 | 0.02320243 |
| −0.14961900 | 0.01072482 | −0.14812594 | 0.02346084 |
| −0.14959978 | 0.01098592 | −0.14808382 | 0.02371919 |
| −0.14958010 | 0.01124698 | −0.14804124 | 0.02397745 |
| −0.14955994 | 0.01150801 | −0.14799820 | 0.02423563 |
| −0.14953931 | 0.01176900 | −0.14795469 | 0.02449374 |

TABLE I-continued

| Z | Y | Z | Y |
|---|---|---|---|
| −0.14951822 | 0.01202995 | −0.14791072 | 0.02475177 |
| −0.14949665 | 0.01229086 | −0.14786630 | 0.02500971 |
| −0.14947461 | 0.01255173 | −0.14782141 | 0.02526758 |
| −0.14777606 | 0.02552536 | −0.14415087 | 0.04106246 |
| −0.14773025 | 0.02578306 | −0.14407759 | 0.04131358 |
| −0.14768398 | 0.02604067 | −0.14400387 | 0.04156458 |
| −0.14763725 | 0.02629820 | −0.14392970 | 0.04181544 |
| −0.14759006 | 0.02655564 | −0.14385510 | 0.04206618 |
| −0.14754241 | 0.02681300 | −0.14378006 | 0.04231677 |
| −0.14749430 | 0.02707027 | −0.14370459 | 0.04256724 |
| −0.14744573 | 0.02732745 | −0.14362868 | 0.04281757 |
| −0.14739671 | 0.02758454 | −0.14355233 | 0.04306776 |
| −0.14734722 | 0.02784155 | −0.14347554 | 0.04331782 |
| −0.14729728 | 0.02809846 | −0.14339832 | 0.04356774 |
| −0.14724689 | 0.02835528 | −0.14332066 | 0.04381752 |
| −0.14719603 | 0.02861201 | −0.14324257 | 0.04406717 |
| −0.14714472 | 0.02886865 | −0.14316405 | 0.04431668 |
| −0.14709295 | 0.02912519 | −0.14308509 | 0.04456604 |
| −0.14704072 | 0.02938164 | −0.14300569 | 0.04481527 |
| −0.14698804 | 0.02963799 | −0.14292587 | 0.04506435 |
| −0.14693491 | 0.02989424 | −0.14284561 | 0.04531330 |
| −0.14688131 | 0.03015040 | −0.14276492 | 0.04556210 |
| −0.14682727 | 0.03040646 | −0.14268379 | 0.04581075 |
| −0.14677276 | 0.03066243 | −0.14260224 | 0.04605927 |
| −0.14671781 | 0.03091829 | −0.14252025 | 0.04630764 |
| −0.14666240 | 0.03117405 | −0.14243784 | 0.04655586 |
| −0.14660653 | 0.03142972 | −0.14235499 | 0.04680394 |
| −0.14655021 | 0.03168528 | −0.14227171 | 0.04705187 |
| −0.14649344 | 0.03194074 | −0.14218801 | 0.04729965 |
| −0.14643622 | 0.03219609 | −0.14210387 | 0.04754729 |
| −0.14637854 | 0.03245134 | −0.14201931 | 0.04779478 |
| −0.14632041 | 0.03270649 | −0.14193432 | 0.04804212 |
| −0.14626183 | 0.03296153 | −0.14184891 | 0.04828931 |
| −0.14620280 | 0.03321646 | −0.14176306 | 0.04853634 |
| −0.14614332 | 0.03347129 | −0.14167679 | 0.04878323 |
| −0.14608339 | 0.03372601 | −0.14159009 | 0.04902997 |
| −0.14602300 | 0.03398062 | −0.14150297 | 0.04927655 |
| −0.14596217 | 0.03423512 | −0.14141542 | 0.04952298 |
| −0.14590089 | 0.03448951 | −0.14132745 | 0.04976925 |
| −0.14583915 | 0.03474379 | −0.14123905 | 0.05001537 |
| −0.14577697 | 0.03499795 | −0.14115023 | 0.05026134 |
| −0.14571434 | 0.03525201 | −0.14106099 | 0.05050715 |
| −0.14565126 | 0.03550595 | −0.14097133 | 0.05075280 |
| −0.14558774 | 0.03575978 | −0.14088124 | 0.05099830 |
| −0.14552376 | 0.03601349 | −0.14079073 | 0.05124363 |
| −0.14545934 | 0.03626709 | −0.14069979 | 0.05148881 |
| −0.14539447 | 0.03652057 | −0.14060844 | 0.05173383 |
| −0.14532916 | 0.03677393 | −0.14051667 | 0.05197869 |
| −0.14526340 | 0.03702718 | −0.14042448 | 0.05222339 |
| −0.14519719 | 0.03728030 | −0.14033186 | 0.05246793 |
| −0.14513054 | 0.03753331 | −0.14023883 | 0.05271231 |
| −0.14506344 | 0.03778620 | −0.14014538 | 0.05295653 |
| −0.14499590 | 0.03803896 | −0.14005151 | 0.05320058 |
| −0.14492792 | 0.03829161 | −0.13995723 | 0.05344447 |
| −0.14485949 | 0.03854413 | −0.13986252 | 0.05368819 |
| −0.14479061 | 0.03879653 | −0.13976740 | 0.05393175 |
| −0.14472130 | 0.03904880 | −0.13967187 | 0.05417515 |
| −0.14465154 | 0.03930095 | −0.13957592 | 0.05441838 |
| −0.14458134 | 0.03955298 | −0.13947955 | 0.05466144 |
| −0.14451070 | 0.03980488 | −0.13938277 | 0.05490433 |
| −0.14443961 | 0.04005665 | −0.13928557 | 0.05514706 |
| −0.14436809 | 0.04030830 | −0.13918796 | 0.05538962 |
| −0.14429612 | 0.04055981 | −0.13908994 | 0.05563201 |
| −0.14422372 | 0.04081120 | −0.13899151 | 0.05587423 |
| −0.13889266 | 0.05611628 | −0.13210345 | 0.07053667 |
| −0.13879340 | 0.05635816 | −0.13198003 | 0.07076707 |
| −0.13869373 | 0.05659986 | −0.13185624 | 0.07099727 |
| −0.13859365 | 0.05684140 | −0.13173207 | 0.07122726 |
| −0.13849316 | 0.05708276 | −0.13160752 | 0.07145705 |
| −0.13839225 | 0.05732395 | −0.13148259 | 0.07168663 |
| −0.13829094 | 0.05756496 | −0.13135728 | 0.07191601 |
| −0.13818922 | 0.05780580 | −0.13123160 | 0.07214518 |
| −0.13808710 | 0.05804647 | −0.13110554 | 0.07237414 |
| −0.13798456 | 0.05828696 | −0.13097910 | 0.07260290 |
| −0.13788162 | 0.05852727 | −0.13085229 | 0.07283145 |
| −0.13777827 | 0.05876741 | −0.13072510 | 0.07305979 |

TABLE I-continued

| Z | Y | Z | Y |
|---|---|---|---|
| −0.13767451 | 0.05900737 | −0.13059754 | 0.07328792 |
| −0.13757035 | 0.05924715 | −0.13046960 | 0.07351584 |
| −0.13746578 | 0.05948676 | −0.13034129 | 0.07374356 |
| −0.13736081 | 0.05972618 | −0.13021261 | 0.07397106 |
| −0.13725544 | 0.05996543 | −0.13008356 | 0.07419835 |
| −0.13714966 | 0.06020449 | −0.12995413 | 0.07442543 |
| −0.13704347 | 0.06044337 | −0.12982433 | 0.07465230 |
| −0.13693689 | 0.06068208 | −0.12969417 | 0.07487896 |
| −0.13682990 | 0.06092060 | −0.12956363 | 0.07510541 |
| −0.13672251 | 0.06115893 | −0.12957160 | 0.07541247 |
| −0.13661472 | 0.06139709 | −0.12957908 | 0.07571990 |
| −0.13650653 | 0.06163506 | −0.12958607 | 0.07602769 |
| −0.13639793 | 0.06187285 | −0.12959255 | 0.07633585 |
| −0.13628894 | 0.06211045 | −0.12959854 | 0.07664436 |
| −0.13617955 | 0.06234787 | −0.12960402 | 0.07695323 |
| −0.13606976 | 0.06258510 | −0.12960900 | 0.07726247 |
| −0.13595958 | 0.06282214 | −0.12961347 | 0.07757206 |
| −0.13584899 | 0.06305900 | −0.12961744 | 0.07788202 |
| −0.13573801 | 0.06329567 | −0.12962090 | 0.07819233 |
| −0.13562663 | 0.06353216 | −0.12962385 | 0.07850300 |
| −0.13551485 | 0.06376845 | −0.12962629 | 0.07881402 |
| −0.13540268 | 0.06400456 | −0.12962822 | 0.07912540 |
| −0.13529012 | 0.06424047 | −0.12962963 | 0.07943714 |
| −0.13517716 | 0.06447620 | −0.12963052 | 0.07974923 |
| −0.13506381 | 0.06471173 | −0.12963089 | 0.08006167 |
| −0.13495006 | 0.06494708 | −0.12963077 | 0.08037448 |
| −0.13483592 | 0.06518223 | −0.12963011 | 0.08068764 |
| −0.13472139 | 0.06541719 | −0.12962893 | 0.08100115 |
| −0.13460646 | 0.06565196 | −0.12962722 | 0.08131500 |
| −0.13449114 | 0.06588653 | −0.12962499 | 0.08162921 |
| −0.13437544 | 0.06612091 | −0.12962222 | 0.08194377 |
| −0.13425934 | 0.06635510 | −0.12961893 | 0.08225867 |
| −0.13414285 | 0.06658909 | −0.12961510 | 0.08257393 |
| −0.13402598 | 0.06682289 | −0.12961074 | 0.08288953 |
| −0.13390871 | 0.06705649 | −0.12960585 | 0.08320548 |
| −0.13379106 | 0.06728989 | −0.12960042 | 0.08352177 |
| −0.13367302 | 0.06752310 | −0.12959445 | 0.08383841 |
| −0.13355459 | 0.06775611 | −0.12958795 | 0.08415540 |
| −0.13343578 | 0.06798892 | −0.12958090 | 0.08447272 |
| −0.13331657 | 0.06822154 | −0.12957330 | 0.08479039 |
| −0.13319699 | 0.06845395 | −0.12956517 | 0.08510841 |
| −0.13307702 | 0.06868617 | −0.12955648 | 0.08542676 |
| −0.13295666 | 0.06891819 | −0.12954725 | 0.08574546 |
| −0.13283592 | 0.06915000 | −0.12953747 | 0.08606449 |
| −0.13271480 | 0.06938162 | −0.12952714 | 0.08638386 |
| −0.13259329 | 0.06961303 | −0.12951625 | 0.08670357 |
| −0.13247140 | 0.06984425 | −0.12950481 | 0.08702362 |
| −0.13234913 | 0.07007526 | −0.12949281 | 0.08734400 |
| −0.13222648 | 0.07030607 | −0.12948025 | 0.08766472 |
| −0.12946714 | 0.08798577 | −0.12754052 | 0.10816222 |
| −0.12945346 | 0.08830716 | −0.12748936 | 0.10850195 |
| −0.12943529 | 0.08862888 | −0.12743754 | 0.10884194 |
| −0.12942441 | 0.08895093 | −0.12738505 | 0.10918219 |
| −0.12940903 | 0.08927331 | −0.12733188 | 0.10952270 |
| −0.12939309 | 0.08959602 | −0.12727805 | 0.10986347 |
| −0.12937658 | 0.08991907 | −0.12722354 | 0.11020449 |
| −0.12935950 | 0.09024243 | −0.12716836 | 0.11054577 |
| −0.12934184 | 0.09056613 | −0.12711250 | 0.11088730 |
| −0.12932360 | 0.09089015 | −0.12705597 | 0.11122909 |
| −0.12930479 | 0.09121450 | −0.12699875 | 0.11157113 |
| −0.12928540 | 0.09153917 | −0.12694085 | 0.11191341 |
| −0.12926544 | 0.09186416 | −0.12688227 | 0.11225595 |
| −0.12924488 | 0.09218948 | −0.12682300 | 0.11259873 |
| −0.12922375 | 0.09251512 | −0.12676304 | 0.11294175 |
| −0.12920203 | 0.09284108 | −0.12670240 | 0.11328502 |
| −0.12917972 | 0.09316735 | −0.12664107 | 0.11362853 |
| −0.12915682 | 0.09349395 | −0.12657904 | 0.11397228 |
| −0.12913334 | 0.09382086 | −0.12651633 | 0.11431627 |
| −0.12910926 | 0.09414809 | −0.12645291 | 0.11466050 |
| −0.12908458 | 0.09447563 | −0.12638880 | 0.11500496 |
| −0.12905931 | 0.09480349 | −0.12632400 | 0.11534966 |
| −0.12903344 | 0.09513166 | −0.12625849 | 0.11569459 |
| −0.12900698 | 0.09546014 | −0.12619228 | 0.11603975 |
| −0.12897991 | 0.09578894 | −0.12612537 | 0.11638514 |
| −0.12895224 | 0.09611804 | −0.12605775 | 0.11673076 |
| −0.12892397 | 0.09644745 | −0.12598943 | 0.11707660 |
| −0.12889509 | 0.09677717 | −0.12592040 | 0.11742267 |
| −0.12886560 | 0.09710720 | −0.12585066 | 0.11776897 |
| −0.12883550 | 0.09743753 | −0.12578021 | 0.11811548 |
| −0.12880480 | 0.09776816 | −0.12570905 | 0.11846221 |
| −0.12877348 | 0.09809910 | −0.12563717 | 0.11880916 |
| −0.12874154 | 0.09843034 | −0.12556457 | 0.11915633 |
| −0.12870899 | 0.09876188 | −0.12549126 | 0.11950371 |
| −0.12867582 | 0.09909372 | −0.12541723 | 0.11985131 |
| −0.12864203 | 0.09942586 | −0.12534248 | 0.12019912 |
| −0.12860762 | 0.09975830 | −0.12526701 | 0.12054713 |
| −0.12857259 | 0.10009103 | −0.12519081 | 0.12089536 |
| −0.12853693 | 0.10042406 | −0.12511389 | 0.12124379 |
| −0.12850065 | 0.10075738 | −0.12503624 | 0.12159243 |
| −0.12846374 | 0.10109099 | −0.12495786 | 0.12194127 |
| −0.12842620 | 0.10142490 | −0.12487875 | 0.12229031 |
| −0.12838802 | 0.10175909 | −0.12479891 | 0.12263955 |
| −0.12834922 | 0.10209358 | −0.12471834 | 0.12298899 |
| −0.12830978 | 0.10242835 | −0.12463703 | 0.12333862 |
| −0.12826970 | 0.10276341 | −0.12455499 | 0.12368845 |
| −0.12822898 | 0.10309875 | −0.12447220 | 0.12403847 |
| −0.12818763 | 0.10343438 | −0.12438868 | 0.12438868 |
| −0.12814563 | 0.10377029 | −0.12430442 | 0.12473908 |
| −0.12810299 | 0.10410648 | −0.12421941 | 0.12508967 |
| −0.12805971 | 0.10444295 | −0.12413366 | 0.12544044 |
| −0.12801577 | 0.10477970 | −0.12404717 | 0.12579140 |
| −0.12797119 | 0.10511672 | −0.12395993 | 0.12614254 |
| −0.12792596 | 0.10545403 | −0.12387193 | 0.12649385 |
| −0.12788008 | 0.10579160 | −0.12378319 | 0.12684535 |
| −0.12783355 | 0.10612945 | −0.12369370 | 0.12719702 |
| −0.12778636 | 0.10646758 | −0.12360346 | 0.12754887 |
| −0.12773851 | 0.10680597 | −0.12351245 | 0.12790089 |
| −0.12769000 | 0.10714463 | −0.12342070 | 0.12825308 |
| −0.12764084 | 0.10748356 | −0.12332818 | 0.12860544 |
| −0.12759101 | 0.10782276 | −0.12323491 | 0.12895797 |
| −0.12314088 | 0.12931066 | −0.11591069 | 0.15105775 |
| −0.12304608 | 0.12966351 | −0.11576682 | 0.15141671 |
| −0.12295052 | 0.13001653 | −0.11562210 | 0.15177570 |
| −0.12285419 | 0.13036970 | −0.11547654 | 0.15213472 |
| −0.12275710 | 0.13072304 | −0.11533013 | 0.15249377 |
| −0.12265924 | 0.13107652 | −0.11518288 | 0.15285285 |
| −0.12256061 | 0.13143017 | −0.11503478 | 0.15321194 |
| −0.12246121 | 0.13178396 | −0.11488583 | 0.15357106 |
| −0.12236104 | 0.13213790 | −0.11473604 | 0.15393020 |
| −0.12226009 | 0.13249200 | −0.11458539 | 0.15428936 |
| −0.12215837 | 0.13284623 | −0.11443389 | 0.15464853 |
| −0.12205587 | 0.13320061 | −0.11428154 | 0.15500771 |
| −0.12195260 | 0.13355514 | −0.11412833 | 0.15536690 |
| −0.12184854 | 0.13390980 | −0.11397427 | 0.15572610 |
| −0.12174371 | 0.13426460 | −0.11381936 | 0.15608530 |
| −0.12163809 | 0.13461954 | −0.11366359 | 0.15644450 |
| −0.12153168 | 0.13497461 | −0.11350696 | 0.15680371 |
| −0.12142450 | 0.13532981 | −0.11334947 | 0.15716291 |
| −0.12131652 | 0.13568514 | −0.11319112 | 0.15752211 |
| −0.12120776 | 0.13604061 | −0.11303191 | 0.15788130 |
| −0.12109821 | 0.13639619 | −0.11287184 | 0.15824048 |
| −0.12098786 | 0.13675190 | −0.11271091 | 0.15859965 |
| −0.12087673 | 0.13710774 | −0.11254911 | 0.15895881 |
| −0.12076480 | 0.13746369 | −0.11238645 | 0.15931795 |
| −0.12065208 | 0.13781976 | −0.11222293 | 0.15967707 |
| −0.12053856 | 0.13817594 | −0.11205853 | 0.16003617 |
| −0.12042424 | 0.13853224 | −0.11189327 | 0.16039525 |
| −0.12030913 | 0.13888865 | −0.11175080 | 0.16078833 |
| −0.12019321 | 0.13924518 | −0.11160691 | 0.16118085 |
| −0.12007649 | 0.13960180 | −0.11146159 | 0.16157278 |
| −0.11995897 | 0.13995854 | −0.11131486 | 0.16196412 |
| −0.11984065 | 0.14031537 | −0.11116669 | 0.16235485 |
| −0.11972152 | 0.14067231 | −0.11101711 | 0.16274499 |
| −0.11960158 | 0.14102935 | −0.11086610 | 0.16313451 |
| −0.11948084 | 0.14138648 | −0.11071366 | 0.16352340 |
| −0.11935928 | 0.14174371 | −0.11055981 | 0.16391165 |
| −0.11923692 | 0.14210103 | −0.11040453 | 0.16429927 |
| −0.11911374 | 0.14245844 | −0.11024782 | 0.16468623 |
| −0.11898975 | 0.14281594 | −0.11008970 | 0.16507254 |
| −0.11886495 | 0.14317352 | −0.10993015 | 0.16545818 |
| −0.11873933 | 0.14353119 | −0.10976918 | 0.16584314 |
| −0.11861289 | 0.14388894 | −0.10960679 | 0.16622742 |
| −0.11848564 | 0.14424677 | −0.10944298 | 0.16661101 |
| −0.11835756 | 0.14460468 | −0.10927775 | 0.16699390 |

TABLE I-continued

| Z | Y | Z | Y |
|---|---|---|---|
| −0.11822866 | 0.14496266 | −0.10911110 | 0.16737609 |
| −0.11809895 | 0.14532072 | −0.10894303 | 0.16775756 |
| −0.11796841 | 0.14567885 | −0.10877355 | 0.16813831 |
| −0.11783704 | 0.14603704 | −0.10860265 | 0.16851832 |
| −0.11770485 | 0.14639531 | −0.10843034 | 0.16889761 |
| −0.11757183 | 0.14675363 | −0.10825661 | 0.16927614 |
| −0.11743798 | 0.14711202 | −0.10808147 | 0.16965393 |
| −0.11730331 | 0.14747047 | −0.10790492 | 0.17003095 |
| −0.11716780 | 0.14782898 | −0.10772697 | 0.17040721 |
| −0.11703147 | 0.14818754 | −0.10754760 | 0.17078270 |
| −0.11689430 | 0.14854615 | −0.10736684 | 0.17115740 |
| −0.11675629 | 0.14890482 | −0.10718466 | 0.17153132 |
| −0.11661745 | 0.14926353 | −0.10700109 | 0.17190444 |
| −0.11647778 | 0.14962229 | −0.10681612 | 0.17227676 |
| −0.11633726 | 0.14998110 | −0.10662975 | 0.17264827 |
| −0.11619591 | 0.15033994 | −0.10644198 | 0.17301897 |
| −0.11605372 | 0.15069883 | −0.10625282 | 0.17338885 |
| −0.10606227 | 0.17375790 | −0.09194380 | 0.19450862 |
| −0.10587034 | 0.17412611 | −0.09167425 | 0.19481769 |
| −0.10567701 | 0.17449349 | −0.09140357 | 0.19512572 |
| −0.10548231 | 0.17486002 | −0.09113177 | 0.19543271 |
| −0.10528622 | 0.17522569 | −0.09085886 | 0.19573865 |
| −0.10508875 | 0.17559051 | −0.09058483 | 0.19604354 |
| −0.10488991 | 0.17595446 | −0.09030971 | 0.19634739 |
| −0.10468970 | 0.17631755 | −0.09003348 | 0.19665018 |
| −0.10448811 | 0.17667975 | −0.08975617 | 0.19695194 |
| −0.10428516 | 0.17704108 | −0.08947777 | 0.19725264 |
| −0.10408085 | 0.17740151 | −0.08919828 | 0.19755229 |
| −0.10387518 | 0.17776106 | −0.08891772 | 0.19785090 |
| −0.10366814 | 0.17811971 | −0.08863609 | 0.19814846 |
| −0.10345976 | 0.17847745 | −0.08835339 | 0.19844497 |
| −0.10325002 | 0.17883429 | −0.08806964 | 0.19874044 |
| −0.10303894 | 0.17919021 | −0.08778483 | 0.19903485 |
| −0.10282651 | 0.17954521 | −0.08749897 | 0.19932822 |
| −0.10261275 | 0.17989929 | −0.08721207 | 0.19962054 |
| −0.10239764 | 0.18025245 | −0.08692413 | 0.19991182 |
| −0.10218121 | 0.18060467 | −0.08663516 | 0.20020204 |
| −0.10196344 | 0.18095595 | −0.08634516 | 0.20049122 |
| −0.10174435 | 0.18130629 | −0.08605414 | 0.20077936 |
| −0.10152393 | 0.18165569 | −0.08576211 | 0.20106645 |
| −0.10130220 | 0.18200414 | −0.08546906 | 0.20135249 |
| −0.10107916 | 0.18235163 | −0.08517501 | 0.20163750 |
| −0.10085480 | 0.18269816 | −0.08487996 | 0.20192145 |
| −0.10062914 | 0.18304373 | −0.08458392 | 0.20220437 |
| −0.10040218 | 0.18338834 | −0.08428689 | 0.20248624 |
| −0.10017392 | 0.18373197 | −0.08398887 | 0.20276708 |
| −0.09994437 | 0.18407464 | −0.08368988 | 0.20304687 |
| −0.09971353 | 0.18441632 | −0.08338992 | 0.20332562 |
| −0.09948141 | 0.18475702 | −0.08308898 | 0.20360334 |
| −0.09924800 | 0.18509674 | −0.08278709 | 0.20388002 |
| −0.09901332 | 0.18543548 | −0.08248424 | 0.20415566 |
| −0.09877737 | 0.18577322 | −0.08218044 | 0.20443027 |
| −0.09854015 | 0.18610996 | −0.08190315 | 0.20477249 |
| −0.09830167 | 0.18644572 | −0.08162500 | 0.20511456 |
| −0.09806194 | 0.18678047 | −0.08134596 | 0.20545645 |
| −0.09782095 | 0.18711422 | −0.08106606 | 0.20579818 |
| −0.09757871 | 0.18744696 | −0.08078528 | 0.20613975 |
| −0.09733523 | 0.18777870 | −0.08050363 | 0.20648114 |
| −0.09709051 | 0.18810942 | −0.08022111 | 0.20682236 |
| −0.09684456 | 0.18843913 | −0.07993770 | 0.20716340 |
| −0.09659738 | 0.18876783 | −0.07965343 | 0.20750427 |
| −0.09634898 | 0.18909551 | −0.07936827 | 0.20784496 |
| −0.09609935 | 0.18942217 | −0.07908224 | 0.20818547 |
| −0.09584852 | 0.18974781 | −0.07879533 | 0.20852579 |
| −0.09559647 | 0.19007243 | −0.07850754 | 0.20886593 |
| −0.09534322 | 0.19039601 | −0.07821888 | 0.20920589 |
| −0.09508877 | 0.19071858 | −0.07792933 | 0.20954565 |
| −0.09483313 | 0.19104011 | −0.07763890 | 0.20988523 |
| −0.09457630 | 0.19136061 | −0.07734760 | 0.21022461 |
| −0.09431829 | 0.19168008 | −0.07705541 | 0.21056380 |
| −0.09405910 | 0.19199852 | −0.07676234 | 0.21090280 |
| −0.09379874 | 0.19231591 | −0.07646839 | 0.21124159 |
| −0.09353721 | 0.19263228 | −0.07617355 | 0.21158019 |
| −0.09327452 | 0.19294760 | −0.07587784 | 0.21191858 |
| −0.09301067 | 0.19326189 | −0.07558124 | 0.21225677 |
| −0.09274566 | 0.19357513 | −0.07528375 | 0.21259475 |
| −0.09247952 | 0.19388734 | −0.07498538 | 0.21293253 |
| −0.09221223 | 0.19419850 | −0.07468612 | 0.21327009 |
| −0.07438598 | 0.21360744 | −0.05438462 | 0.23370399 |
| −0.07408495 | 0.21394458 | −0.05402874 | 0.23402420 |
| −0.07378304 | 0.21428150 | −0.05367196 | 0.23434407 |
| −0.07348023 | 0.21461820 | −0.05331426 | 0.23466359 |
| −0.07317654 | 0.21495469 | −0.05295565 | 0.23498276 |
| −0.07287197 | 0.21529095 | −0.05259614 | 0.23530159 |
| −0.07256650 | 0.21562698 | −0.05223571 | 0.23562007 |
| −0.07226014 | 0.21596279 | −0.05187437 | 0.23593819 |
| −0.07195289 | 0.21629838 | −0.05151213 | 0.23625596 |
| −0.07164476 | 0.21663373 | −0.05114897 | 0.23657337 |
| −0.07133573 | 0.21696885 | −0.05078491 | 0.23689042 |
| −0.07102581 | 0.21730373 | −0.05041993 | 0.23720711 |
| −0.07071500 | 0.21763838 | −0.05005404 | 0.23752344 |
| −0.07040329 | 0.21797280 | −0.04968724 | 0.23783940 |
| −0.07009070 | 0.21830697 | −0.04931953 | 0.23815499 |
| −0.06977721 | 0.21864089 | −0.04895091 | 0.23847022 |
| −0.06946283 | 0.21897458 | −0.04858137 | 0.23878507 |
| −0.06914755 | 0.21930801 | −0.04821093 | 0.23909955 |
| −0.06883138 | 0.21964120 | −0.04783957 | 0.23941365 |
| −0.06851432 | 0.21997414 | −0.04746730 | 0.23972737 |
| −0.06819636 | 0.22030683 | −0.04709412 | 0.24004071 |
| −0.06787750 | 0.22063926 | −0.04672002 | 0.24035367 |
| −0.06755775 | 0.22097143 | −0.04634501 | 0.24066625 |
| −0.06723710 | 0.22130335 | −0.04596910 | 0.24097844 |
| −0.06691555 | 0.22163500 | −0.04559226 | 0.24129024 |
| −0.06659311 | 0.22196640 | −0.04521452 | 0.24160165 |
| −0.06626977 | 0.22229752 | −0.04483586 | 0.24191266 |
| −0.06594553 | 0.22262838 | −0.04445629 | 0.24222328 |
| −0.06562039 | 0.22295897 | −0.04407581 | 0.24253350 |
| −0.06529436 | 0.22328929 | −0.04369441 | 0.24284333 |
| −0.06496742 | 0.22361934 | −0.04331210 | 0.24315275 |
| −0.06463959 | 0.22394911 | −0.04292888 | 0.24346176 |
| −0.06431086 | 0.22427861 | −0.04254474 | 0.24377037 |
| −0.06398122 | 0.22460782 | −0.04215969 | 0.24407858 |
| −0.06365069 | 0.22493676 | −0.04177373 | 0.24438637 |
| −0.06331925 | 0.22526541 | −0.04138685 | 0.24469375 |
| −0.06298691 | 0.22559377 | −0.04099906 | 0.24500071 |
| −0.06265367 | 0.22592185 | −0.04061035 | 0.24530726 |
| −0.06231953 | 0.22624964 | −0.04022073 | 0.24561338 |
| −0.06198449 | 0.22657713 | −0.03983020 | 0.24591909 |
| −0.06164854 | 0.22690433 | −0.03943875 | 0.24622437 |
| −0.06131169 | 0.22723124 | −0.03904639 | 0.24652923 |
| −0.06097394 | 0.22755785 | −0.03865312 | 0.24683366 |
| −0.06063529 | 0.22788416 | −0.03825893 | 0.24713766 |
| −0.06029573 | 0.22821016 | −0.03786383 | 0.24744123 |
| −0.05995526 | 0.22853586 | −0.03746781 | 0.24774436 |
| −0.05961389 | 0.22886126 | −0.03707088 | 0.24804706 |
| −0.05927162 | 0.22918635 | −0.03667304 | 0.24834932 |
| −0.05892844 | 0.22951112 | −0.03627428 | 0.24865113 |
| −0.05858436 | 0.22983559 | −0.03587460 | 0.24895251 |
| −0.05823937 | 0.23015973 | −0.03547402 | 0.24925344 |
| −0.05789347 | 0.23048357 | −0.03507252 | 0.24955392 |
| −0.05754667 | 0.23080708 | −0.03467010 | 0.24985395 |
| −0.05719896 | 0.23113027 | −0.03426677 | 0.25015353 |
| −0.05685034 | 0.23145314 | −0.03386253 | 0.25045266 |
| −0.05650082 | 0.23177568 | −0.03345737 | 0.25075133 |
| −0.05615039 | 0.23209790 | −0.03305130 | 0.25104955 |
| −0.05579905 | 0.23241979 | −0.03264431 | 0.25134730 |
| −0.05544681 | 0.23274134 | −0.03223642 | 0.25164459 |
| −0.05509366 | 0.23306256 | −0.03182760 | 0.25194142 |
| −0.05473959 | 0.23338345 | −0.03141788 | 0.25223778 |
| −0.03100724 | 0.25253367 | −0.00423537 | 0.26961006 |
| −0.03059568 | 0.25282909 | −0.00376838 | 0.26987264 |
| −0.03018321 | 0.25312404 | −0.00330048 | 0.27013461 |
| −0.02976983 | 0.25341851 | −0.00283168 | 0.27039597 |
| −0.02935554 | 0.25371250 | −0.00236199 | 0.27065672 |
| −0.02894033 | 0.25400602 | −0.00189139 | 0.27091686 |
| −0.02852421 | 0.25429905 | −0.00141989 | 0.27117638 |
| −0.02810717 | 0.25459160 | −0.00094749 | 0.27143529 |
| −0.02768923 | 0.25488366 | −0.00047420 | 0.27169358 |
| −0.02727037 | 0.25517523 | −0.00000000 | 0.27195125 |
| −0.02685059 | 0.25546632 | 0.00047509 | 0.27220829 |
| −0.02642991 | 0.25575691 | 0.00095109 | 0.27246471 |
| −0.02600831 | 0.25604700 | 0.00142797 | 0.27272050 |
| −0.02558579 | 0.25633660 | 0.00190576 | 0.27297566 |
| −0.02516237 | 0.25662570 | 0.00238444 | 0.27323019 |

TABLE I-continued

| Z | Y | Z | Y |
|---|---|---|---|
| −0.02473803 | 0.25691429 | 0.00286402 | 0.27348409 |
| −0.02431278 | 0.25720239 | 0.00334450 | 0.27373735 |
| −0.02388662 | 0.25748998 | 0.00382587 | 0.27398997 |
| −0.02345955 | 0.25777706 | 0.00430814 | 0.27424195 |
| −0.02303157 | 0.25806363 | 0.00479130 | 0.27449329 |
| −0.02260267 | 0.25834968 | 0.00527535 | 0.27474398 |
| −0.02217286 | 0.25863523 | 0.00576030 | 0.27499402 |
| −0.02174214 | 0.25892025 | 0.00624615 | 0.27524342 |
| −0.02131051 | 0.25920476 | 0.00673288 | 0.27549217 |
| −0.02087797 | 0.25948875 | 0.00722051 | 0.27574026 |
| −0.02044452 | 0.25977221 | 0.00770903 | 0.27598770 |
| −0.02001015 | 0.26005515 | 0.00819845 | 0.27623447 |
| −0.01957488 | 0.26033756 | 0.00868875 | 0.27648059 |
| −0.01913870 | 0.26061944 | 0.00917995 | 0.27672605 |
| −0.01870160 | 0.26090078 | 0.00967203 | 0.27697084 |
| −0.01826360 | 0.26118160 | 0.01016501 | 0.27721497 |
| −0.01782468 | 0.26146188 | 0.01065888 | 0.27745842 |
| −0.01738486 | 0.26174162 | 0.01116573 | 0.27800229 |
| −0.01694413 | 0.26202082 | 0.01167453 | 0.27854575 |
| −0.01650248 | 0.26229947 | 0.01218528 | 0.27908879 |
| −0.01605993 | 0.26257758 | 0.01269799 | 0.27963140 |
| −0.01561647 | 0.26285515 | 0.01321265 | 0.28017357 |
| −0.01517211 | 0.26313216 | 0.01372927 | 0.28071529 |
| −0.01472683 | 0.26340863 | 0.01424784 | 0.28125655 |
| −0.01428064 | 0.26368453 | 0.01476837 | 0.28179735 |
| −0.01383355 | 0.26395989 | 0.01529086 | 0.28233766 |
| −0.01338555 | 0.26423468 | 0.01581531 | 0.28287747 |
| −0.01293664 | 0.26450892 | 0.01634171 | 0.28341679 |
| −0.01248683 | 0.26478259 | 0.01687007 | 0.28395560 |
| −0.01203611 | 0.26505570 | 0.01740039 | 0.28449388 |
| −0.01158448 | 0.26532824 | 0.01793267 | 0.28503163 |
| −0.01113195 | 0.26560022 | 0.01846691 | 0.28556883 |
| −0.01067851 | 0.26587162 | 0.01900311 | 0.28610549 |
| −0.01022416 | 0.26614245 | 0.01954126 | 0.28664157 |
| −0.00976891 | 0.26641270 | 0.02008138 | 0.28717709 |
| −0.00931275 | 0.26668238 | 0.02062345 | 0.28771201 |
| −0.00885569 | 0.26695147 | 0.02116749 | 0.28824634 |
| −0.00839773 | 0.26721999 | 0.02171348 | 0.28878006 |
| −0.00793886 | 0.26748791 | 0.02226143 | 0.28931317 |
| −0.00747908 | 0.26775526 | 0.02281135 | 0.28984564 |
| −0.00701840 | 0.26802201 | 0.02336322 | 0.29037748 |
| −0.00655682 | 0.26828818 | 0.02391705 | 0.29090866 |
| −0.00609434 | 0.26855375 | 0.02447283 | 0.29143919 |
| −0.00563095 | 0.26881873 | 0.02503058 | 0.29196904 |
| −0.00516666 | 0.26908311 | 0.02559028 | 0.29249821 |
| −0.00470147 | 0.26934689 | 0.02615194 | 0.29302669 |
| 0.02671555 | 0.29355447 | 0.06473823 | 0.32398321 |
| 0.02728112 | 0.29408153 | 0.06541978 | 0.32444598 |
| 0.02784864 | 0.29460786 | 0.06610315 | 0.32490735 |
| 0.02841812 | 0.29513346 | 0.06678832 | 0.32536733 |
| 0.02898955 | 0.29565831 | 0.06747530 | 0.32582589 |
| 0.02956293 | 0.29618240 | 0.06816408 | 0.32628303 |
| 0.03013827 | 0.29670573 | 0.06885465 | 0.32673874 |
| 0.03071555 | 0.29722827 | 0.06954702 | 0.32719301 |
| 0.03129479 | 0.29775002 | 0.07024118 | 0.32764582 |
| 0.03187597 | 0.29827097 | 0.07093712 | 0.32809717 |
| 0.03245910 | 0.29879111 | 0.07163484 | 0.32854704 |
| 0.03304418 | 0.29931042 | 0.07233434 | 0.32899543 |
| 0.03363120 | 0.29982890 | 0.07303561 | 0.32944232 |
| 0.03422017 | 0.30034654 | 0.07373864 | 0.32988771 |
| 0.03481107 | 0.30086331 | 0.07444344 | 0.33033159 |
| 0.03540392 | 0.30137922 | 0.07514999 | 0.33077393 |
| 0.03599871 | 0.30189425 | 0.07585830 | 0.33121475 |
| 0.03659544 | 0.30240839 | 0.07656836 | 0.33165401 |
| 0.03719410 | 0.30292164 | 0.07728016 | 0.33209172 |
| 0.03779470 | 0.30343397 | 0.07799371 | 0.33252786 |
| 0.03839723 | 0.30394537 | 0.07870898 | 0.33296243 |
| 0.03900169 | 0.30445585 | 0.07942599 | 0.33339541 |
| 0.03960809 | 0.30496537 | 0.08014472 | 0.33382679 |
| 0.04021641 | 0.30547395 | 0.08086517 | 0.33425657 |
| 0.04082666 | 0.30598155 | 0.08158734 | 0.33468473 |
| 0.04143883 | 0.30648818 | 0.08231122 | 0.33511126 |
| 0.04205292 | 0.30699382 | 0.08303680 | 0.33553616 |
| 0.04266894 | 0.30749846 | 0.08376409 | 0.33595941 |
| 0.04328687 | 0.30800210 | 0.08449307 | 0.33638101 |
| 0.04390672 | 0.30850470 | 0.08522374 | 0.33680094 |
| 0.04452849 | 0.30900628 | 0.08595609 | 0.33721919 |
| 0.04515216 | 0.30950681 | 0.08669013 | 0.33763576 |
| 0.04577775 | 0.31000629 | 0.08742584 | 0.33805064 |
| 0.04640524 | 0.31050470 | 0.08816322 | 0.33846381 |
| 0.04703464 | 0.31100204 | 0.08890226 | 0.33887527 |
| 0.04766594 | 0.31149829 | 0.08964296 | 0.33928500 |
| 0.04829914 | 0.31199344 | 0.09038532 | 0.33969300 |
| 0.04893423 | 0.31248748 | 0.09112932 | 0.34009926 |
| 0.04957122 | 0.31298039 | 0.09187497 | 0.34050377 |
| 0.05021011 | 0.31347218 | 0.09262225 | 0.34090651 |
| 0.05085088 | 0.31396283 | 0.09337116 | 0.34130749 |
| 0.05149354 | 0.31445232 | 0.09412170 | 0.34170669 |
| 0.05213809 | 0.31494065 | 0.09487386 | 0.34210409 |
| 0.05278451 | 0.31542780 | 0.09562764 | 0.34249970 |
| 0.05343281 | 0.31591377 | 0.09638302 | 0.34289351 |
| 0.05408299 | 0.31639854 | 0.09714000 | 0.34328549 |
| 0.05473504 | 0.31688210 | 0.09789859 | 0.34367566 |
| 0.05538896 | 0.31736444 | 0.09865876 | 0.34406398 |
| 0.05604475 | 0.31784555 | 0.09942052 | 0.34445047 |
| 0.05670239 | 0.31832543 | 0.10018386 | 0.34483510 |
| 0.05736190 | 0.31880405 | 0.10094877 | 0.34521787 |
| 0.05802327 | 0.31928141 | 0.10171525 | 0.34559877 |
| 0.05868648 | 0.31975749 | 0.10248329 | 0.34597780 |
| 0.05935155 | 0.32023229 | 0.10325289 | 0.34635493 |
| 0.06001846 | 0.32070580 | 0.10402404 | 0.34673017 |
| 0.06068721 | 0.32117800 | 0.10479673 | 0.34710351 |
| 0.06135781 | 0.32164889 | 0.10557096 | 0.34747493 |
| 0.06203024 | 0.32211845 | 0.10634672 | 0.34784443 |
| 0.06270450 | 0.32258667 | 0.10712400 | 0.34821200 |
| 0.06338059 | 0.32305355 | 0.10790280 | 0.34857764 |
| 0.06405850 | 0.32351906 | 0.10868312 | 0.34894132 |
| 0.10946494 | 0.34930306 | | |
| 0.11024826 | 0.34966282 | | |
| 0.11103308 | 0.35002062 | | |
| 0.11181938 | 0.35037644 | | |
| 0.11260717 | 0.35073027 | | |
| 0.11339643 | 0.35108210 | | |
| 0.11418716 | 0.35143193 | | |
| 0.11497935 | 0.35177975 | | |

We claim:

1. A high-brightness, high-efficacy backlight comprising:
   (a) a light source having at least one occurrence of a light source cross sectional shape defined by an intersection of an imaginary plane with said light source; and
   (b) a reflector positioned to receive light from said light source and having a reflector cross sectional shape defined by an intersection of said imaginary plane with said reflector;
   (1) wherein said reflector cross sectional shape includes at least four portions for each said occurrence of said light source cross sectional shape, said portions connected end to end, each of said portions having the shape substantially that of a segment of at least one circle, said at least one circle having a center; and
   (2) wherein said portions are characterized in that the centers of said circles do not lie on a common point.

2. A high-brightness, high-efficacy backlight according to claim 1 wherein:
   (a) said light source emits light, said light source includes a tube having an inner surface and an outer surface, said inner surface defining a volume, said emitted light having at least two portions, the first portion of said emitted light meeting a bounded image plane spaced from the outer surface of said tube;
   (b) said reflector is positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane; and (c) said reflector is further characterized and positioned such that the second component of the reflected second portion of emitted light is reflected into said volume defined by said tube inner surface, said second component of the reflected second portion of emitted light being less than fifty percent of the total light emitted by said light source.

3. A high-brightness, high-efficacy backlight according to claim 1 wherein:

(a) said light source emits light, said light source includes a tube having an inner surface and an outer surface, said inner surface defining a volume, said emitted light having at least two portions, the first portion of said emitted light meeting a bounded image plane spaced from the outer surface of said tube;

(b) said reflector is positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane;

(c) said reflector is further characterized and positioned such that the second component of the reflected second portion of emitted light is reflected into said volume defined by said tube inner surface, said second component of the reflected second portion of emitted light being less than fifty percent of the total light emitted by said light source;

(d) wherein said light source has an overall thickness and a serpentine shape having at least two sections;

(e) wherein said reflector has at least two channels;

(f) wherein each of said tube sections is positioned so as to be nested in one of said channels, and each of said channels has two peaks and a nadir; and (g) wherein the vertical distance between one of said peaks and said nadir of each of said channels is about 96% of the overall thickness of said tube measured at said outer surface.

4. A high-brightness, high-efficacy backlight according to claim 1 wherein:

(a) said light source emits light, said light source includes a tube having an inner surface and an outer surface, said inner surface defining a volume, said emitted light having at least two portions, the first portion of said emitted light meeting a bounded image plane spaced from the outer surface of said tube;

(b) said reflector is positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane;

(c) said reflector is further characterized and positioned such that the second component of the reflected second portion of emitted light is reflected into said volume defined by said tube inner surface, said second component of the reflected second portion of emitted light being less than fifty percent of the total light emitted by said light source;

(d) said light source has an overall thickness and a serpentine shape having at least two sections;

(e) said reflector has at least two channels;

(f) each of said tube sections is positioned so as to be nested in one of said channels, and each of said channels has two peaks and a nadir; and (g) about 4 percent of the overall thickness of any of said tube sections extends above any of said peaks.

5. A high-brightness, high-efficacy backlight according to claim 1 wherein:

(a) said light source emits light, said light source includes a tube having an inner surface and an outer surface, said inner surface defining a volume, said emitted light having at least two portions, the first portion of said emitted light meeting a bounded image plane spaced from the outer surface of said tube;

(b) said reflector is positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane;

(c) said reflector is further characterized and positioned such that the second component of the reflected second portion of emitted light is reflected into said volume defined by said tube inner surface, said second component of the reflected second portion of emitted light being less than fifty percent of the total light emitted by said light source;

(d) said light source has a serpentine shape having at least two sections;

(e) said reflector has at least two channels;

(f) each of said tube sections is positioned so as to be nested in one of said channels, and each of said channels has two peaks and a nadir; and (g) no light is directly emitted from any one of said tube sections to adjacent tube sections.

6. A high-brightness, high-efficacy backlight comprising:

(a) a light source having at least one occurrence of a light source cross sectional shape defined by an intersection of an imaginary plane with said light source; and (b) a reflector positioned to receive light from said light source and having a reflector cross sectional shape defined by an intersection of said imaginary plane with said reflector;

(1) wherein said reflector cross sectional shape includes at least four portions for each said occurrence of said light source cross sectional shape, said portions connected end to end, each of said portions having the shape substantially that of a segment of at least one ellipse, said at least one ellipse having two foci; and (2) wherein said portions are characterized in that the foci of said ellipses do not lie on a common point.

7. A high-brightness, high-efficacy backlight according to claim 6 wherein:

(a) said light source emits light, said light source includes a tube having an inner surface and an outer surface, said inner surface defining a volume, said emitted light having at least two portions, the first portion of said emitted light meeting a bounded image plane spaced from the outer surface of said tube;

(b) said reflector is positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane;

(c) said reflector is further characterized and positioned such that the second component of the reflected second portion of emitted light is reflected into said volume defined by said tube inner surface, said second component of the reflected second portion of emitted light being less than fifty percent of the total light emitted by said light source.

8. A high-brightness, high-efficacy backlight according to claim 6 wherein:

(a) said light source emits light, said light source includes a tube having an inner surface and an outer surface, said inner surface defining a volume, said emitted light having at least two portions, the first portion of said emitted light meeting a bounded image plane spaced from the outer surface of said tube;

(b) said reflector is positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane;

(c) said reflector is further characterized and positioned such that the second component of the reflected second portion of emitted light is reflected into said volume defined by said tube inner surface, said second component of the reflected second portion of emitted light being less than fifty percent of the total light emitted by said light source;

(d) said light source has an overall thickness and a serpentine shape having at least two sections;

(e) said reflector has at least two channels;

(f) each of said tube sections is positioned so as to be nested in one of said channels, and each of said channels has two peaks and a nadir; and (g) the vertical distance between one of said peaks and said nadir of each of said channels is about 96% of the overall thickness of said tube measured at said outer surface.

9. A high-brightness, high-efficacy backlight according to claim 6 wherein:

(a) said light source emits light, said light source includes a tube having an inner surface and an outer surface, said inner surface defining a volume, said emitted light having at least two portions, the first portion of said emitted light meeting a bounded image plane spaced from the outer surface of said tube;

(b) said reflector is positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane;

(c) said reflector is further characterized and positioned such that the second component of the reflected second portion of emitted light is reflected into said volume defined by said tube inner surface, said second component of the reflected second portion of emitted light being less than fifty percent of the total light emitted by said light source;

(d) said light source has an overall thickness and a serpentine shape having at least two sections;

(e) said reflector has at least two channels;

(f) each of said tube sections is positioned so as to be nested in one of said channels, and each of said channels has two peaks and a nadir; and (g) about 4 percent of the overall thickness of any of said tube sections extends above any of said peaks.

10. A high-brightness, high-efficacy backlight according to claim 6 wherein:

(a) said light source emits light, said light source includes a tube having an inner surface and an outer surface, said inner surface defining a volume, said emitted light having at least two portions, the first portion of said emitted light meeting a bounded image plane spaced from the outer surface of said tube;

(b) said reflector is positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane;

(c) said reflector is further characterized and positioned such that the second component of the reflected second portion of emitted light is reflected into said volume defined by said tube inner surface, said second component of the reflected second portion of emitted light being less than fifty percent of the total light emitted by said light source;

23

(d) said light source has a serpentine shape having at least two sections;

(e) said reflector has at least two channels;

(f) each of said tube sections is positioned so as to be nested in one of said channels, and each of said channels has two peaks and a nadir; and (g) no light is directly emitted from any one of said tube sections to adjacent tube sections.

11. A high-brightness, high-efficacy backlight comprising:

(a) a light source emitting light, said light source including a tube having an inner surface and an outer surface, said inner surface defining a volume, said emitted light having at least two portions, the first portion of said emitted light meeting a bounded image plane spaced from the outer surface of said tube; and (b) a reflector optically coupled to said light source, said reflector being positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane;

(1) wherein said reflector is further characterized and positioned such that the second component of the reflected second portion of emitted light is reflected into said volume defined by said tube inner surface, said second component of the reflected second portion of emitted light being a minor portion of the total light emitted by said light source;

(2) wherein said light source has an overall thickness and a serpentine shape having at least two sections;

(3) wherein said reflector has at least two channels;

(4) wherein each of said tube sections is positioned so as to be nested in one of said channels, and each of said channels has two peaks and a nadir; and (5) wherein the vertical distance between one of said peaks and said nadir of each of said channels is about 96% of the overall thickness of said tube measured at said outer surface.

12. A high-brightness, high-efficacy backlight comprising:

(a) a light source emitting light, said light source including a tube having an inner surface and an outer surface, said inner surface defining a volume, said emitted light having at least two portions, the first portion of said emitted light meeting a bounded image plane spaced from the outer surface of said tube; and (b) a reflector optically coupled to said light source, said reflector being positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane;

(1) wherein said reflector is further characterized and positioned such that the second component of the reflected second portion of emitted light is reflected into said volume defined by said tube inner surface, said second component of the reflected second portion of emitted light being a minor portion of the total light emitted by said light source;

(2) wherein said light source has an overall thickness and a serpentine shape having at least two sections;

(3) wherein said reflector has at least two channels;

(4) wherein each of said tube sections is positioned so as to be nested in one of said channels, and each of said channels has two peaks and a nadir; and (5) wherein about 4 percent of the overall thickness of any of said tube sections extends above any of said peaks.

13. A high-brightness, high-efficacy backlight comprising:

(a) a light source emitting light, said light source including a tube having an inner surface and an outer surface, said inner surface defining a volume, said emitted light having at least two portions, the first portion of said emitted light meeting a bounded image plane spaced from the outer surface of said tube; and (b) a reflector optically coupled to said light source, said reflector being positioned such that said light source is positioned between said reflector and said bounded image plane, said reflector being characterized and further positioned to reflect the second portion of the emitted light, the reflected second portion of the emitted light having a first component and a second component; the first component of the second portion of emitted light meeting said bounded image plane to coact with the first portion of said emitted light to provide a substantially uniform intensity distribution at said image plane;

(1) wherein said reflector is further characterized and positioned such that the second component of the reflected second portion of emitted light is reflected into said volume defined by said tube inner surface, said second component of the reflected second portion of emitted light being a minor portion of the total light emitted by said light source;

(2) wherein said light source has a serpentine shape having at least two sections;

(3) wherein said reflector has at least two channels;

(4) wherein each of said tube sections is positioned so as to be nested in one of said channels, and each of said channels has two peaks and a nadir; and (5) wherein no light is directly emitted from any one of said tube sections to adjacent tube sections.

14. A high-brightness, high-efficacy backlight comprising:

(a) a light source having at least one occurrence of a light source cross sectional shape defined by an intersection of an imaginary plane with said light source; and (b) a reflector positioned to receive light from said light source and having a reflector cross sectional shape defined by an intersection of said imaginary plane with said reflector;

(1) wherein said reflector cross sectional shape includes at least four portions for each said occurrence of said light source cross sectional shape, said portions connected end to end, at least one of said portions having the shape substantially that of a segment of at least one circle, said at least one circle having a center, at least one other of said portions having the shape substantially that of a segment of at least one ellipse, said at least one ellipse having two foci; and (2) wherein said portions are characterized in that the center of said circle does not lie on a common point with either of the foci of said ellipse.

* * * * *